US012647957B2

(12) United States Patent
Zhang et al.

(10) Patent No.: US 12,647,957 B2
(45) Date of Patent: Jun. 2, 2026

(54) CARRIER AGGREGATION WITH UPLINK CARRIER SELECTION

(71) Applicant: QUALCOMM Incorporated, San Diego, CA (US)

(72) Inventors: Wentao Zhang, Beijing (CN); Bo Chen, Beijing (CN); Mingkai Nan, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 513 days.

(21) Appl. No.: 18/011,007

(22) PCT Filed: Aug. 13, 2020

(86) PCT No.: PCT/CN2020/108831
§ 371 (c)(1),
(2) Date: Dec. 16, 2022

(87) PCT Pub. No.: WO2022/032557
PCT Pub. Date: Feb. 17, 2022

(65) Prior Publication Data
US 2023/0354281 A1 Nov. 2, 2023

(51) Int. Cl.
*H04W 72/0453* (2023.01)
*H04L 5/00* (2006.01)

(52) U.S. Cl.
CPC ......... *H04W 72/0453* (2013.01); *H04L 5/001* (2013.01)

(58) Field of Classification Search
None
See application file for complete search history.

(56) References Cited

U.S. PATENT DOCUMENTS 9,295,048 B2 3/2016 Malladi et al.
2017/0054535 A1 2/2017 Lim et al.
(Continued)

FOREIGN PATENT DOCUMENTS

CN 101778393 A 7/2010
CN 107210776 A 9/2017
(Continued)

OTHER PUBLICATIONS

Supplementary European Search Report—EP20949056—Search Authority—The Hague—Apr. 10, 2024.
(Continued)

*Primary Examiner* — Srinivasa R Reddivalam
(74) *Attorney, Agent, or Firm* — Loza & Loza, LLP

(57) ABSTRACT

Aspects relate to carrier aggregation. Selection of an uplink component carrier for carrier aggregation may be flexible in the sense that the frequency band of the uplink component carrier need not be one of the frequency bands allocated for the downlink component carriers. Thus, in some aspects, an uplink component carrier may be decoupled from (e.g., independent of) the downlink carriers. A decision of whether to implement flexible uplink component carrier selection may be based on network traffic (e.g., particular traffic use cases). As one example, the data throughput requirement for downlink traffic may be relatively high, but the component carriers selected for the downlink traffic to provide this throughput might not provide a desired level of service for the uplink traffic. Thus, one or more component carrier bands selected for the uplink traffic may be different from any of the component carrier bands selected for the downlink traffic.

35 Claims, 13 Drawing Sheets

(56)          References Cited

U.S. PATENT DOCUMENTS

| | | | |
|---|---|---|---|
| 2017/0318587 A1 | 11/2017 | Lim et al. | |
| 2017/0332280 A1* | 11/2017 | Kuroda | H04W 72/23 |
| 2018/0241453 A1* | 8/2018 | Lee | H04L 1/0028 |
| 2019/0182850 A1* | 6/2019 | Wang | H04W 72/0446 |
| 2020/0029377 A1* | 1/2020 | Chow | H04W 76/15 |
| 2021/0337054 A1* | 10/2021 | Choi | H04W 52/265 |
| 2022/0240080 A1* | 7/2022 | Takahashi | H04L 5/0035 |

FOREIGN PATENT DOCUMENTS

| | | | |
|---|---|---|---|
| CN | 110050499 A | 7/2019 | |
| CN | 110381576 A | 10/2019 | |
| EP | 3404982 A1 | 11/2018 | |
| WO | 2010069259 A1 | 6/2010 | |
| WO | 2014046881 A1 | 3/2014 | |

OTHER PUBLICATIONS

International Search Report and Written Opinion—PCT/CN2020/108831—ISA/EPO—Apr. 26, 2021.
Nokia Networks: "TP for LTE Advanced 3DL/2UL Mixed Intra- and Inter-Band CA", R4-156525, 3GPP TSG-RAN WG4 Meeting #76bis, Sophia Antipolis, France, Oct. 12-16, 2015, Oct. 16, 2015 (Oct. 16, 2015) the Whole Document, 3 Pages.

* cited by examiner

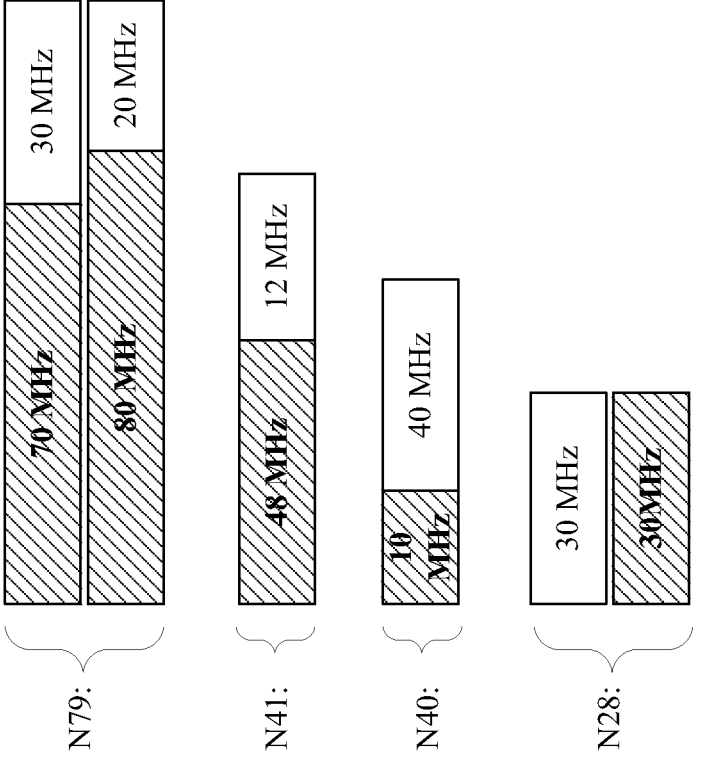
FIG. 5

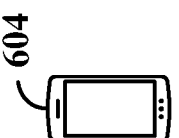
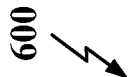
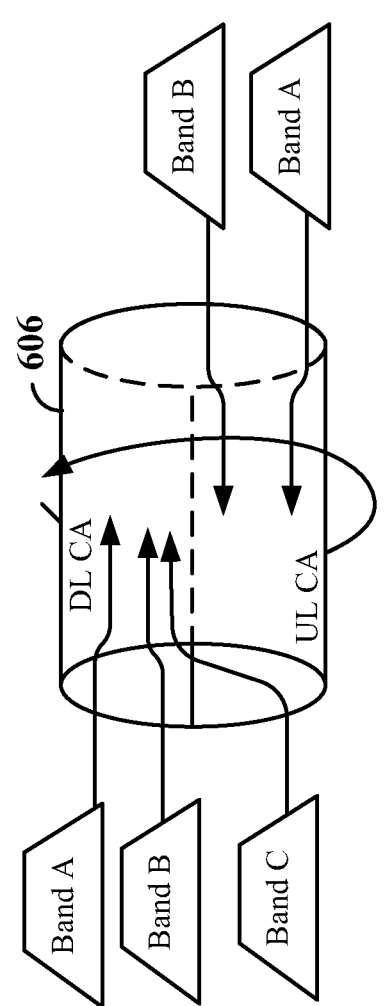
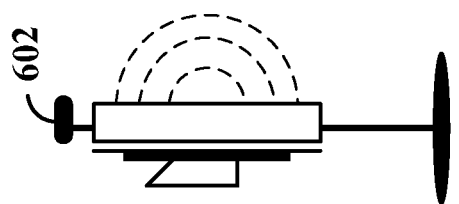
FIG. 6

1100

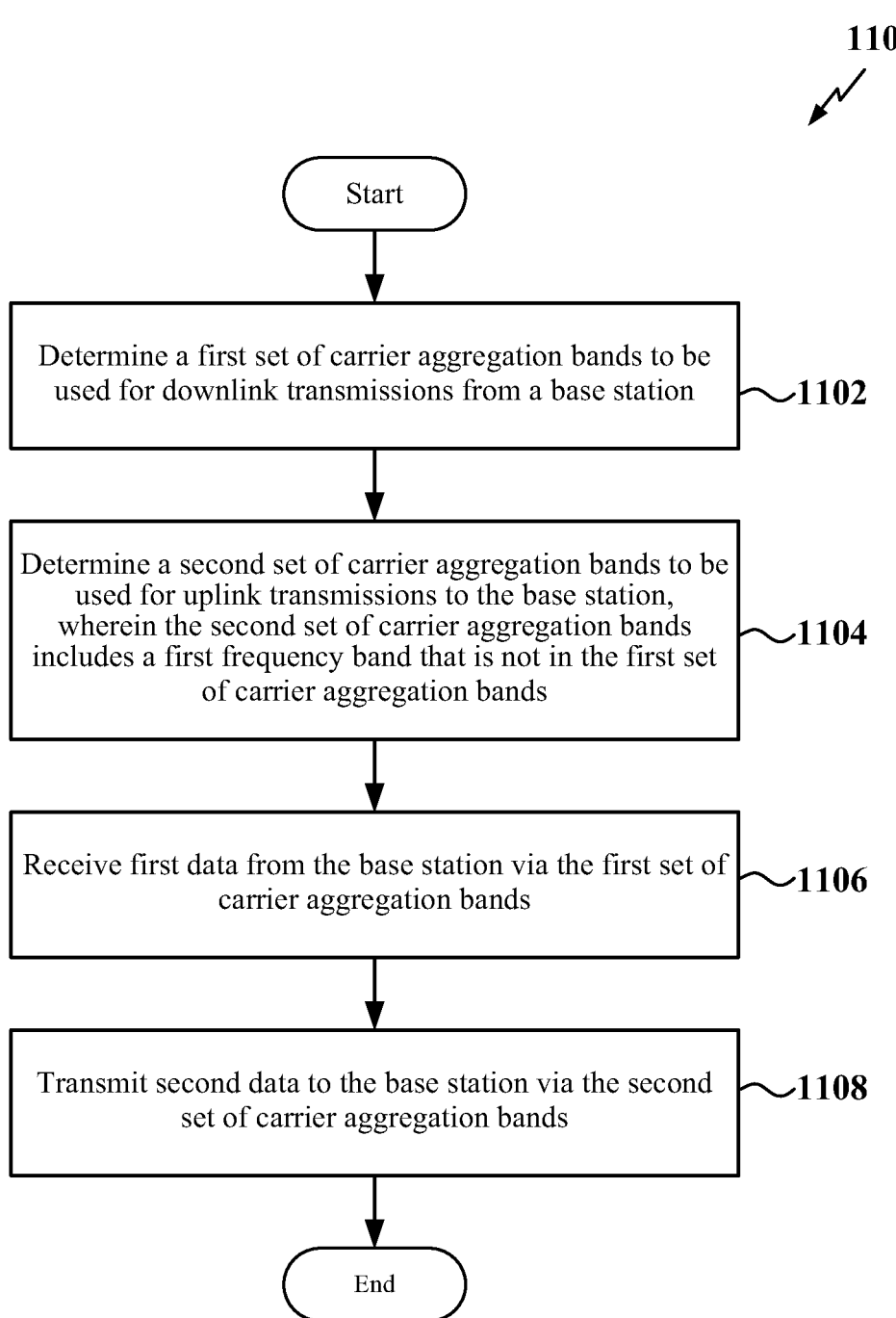

Start

Determine a first set of carrier aggregation bands to be used for downlink transmissions from a base station        1102

Determine a second set of carrier aggregation bands to be used for uplink transmissions to the base station, wherein the second set of carrier aggregation bands includes a first frequency band that is not in the first set of carrier aggregation bands        1104

Receive first data from the base station via the first set of carrier aggregation bands        1106

Transmit second data to the base station via the second set of carrier aggregation bands        1108

End

FIG. 11

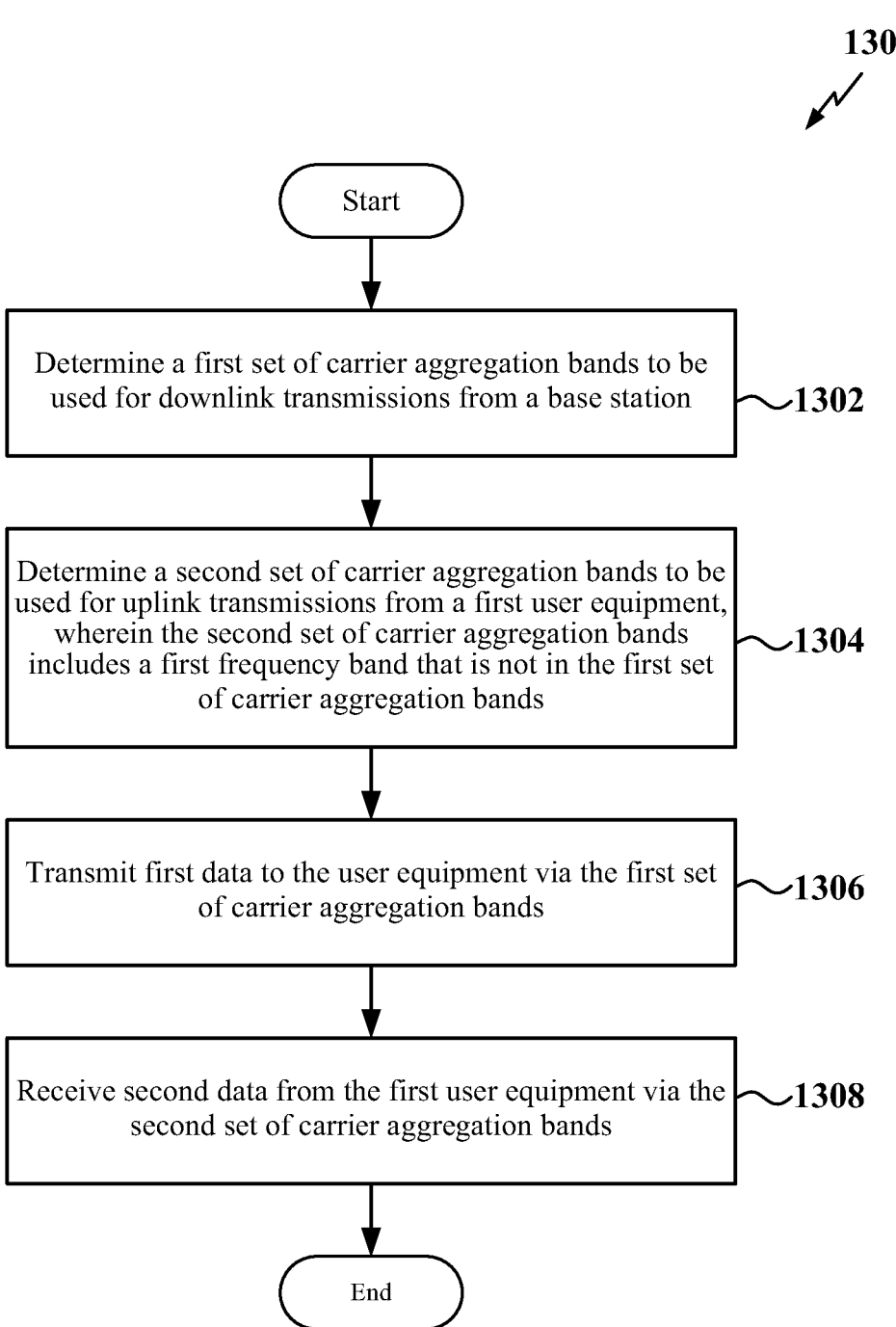

1300

Start

Determine a first set of carrier aggregation bands to be
used for downlink transmissions from a base station     ∼1302

Determine a second set of carrier aggregation bands to be
used for uplink transmissions from a first user equipment,
wherein the second set of carrier aggregation bands
includes a first frequency band that is not in the first set
of carrier aggregation bands     ∼1304

Transmit first data to the user equipment via the first set
of carrier aggregation bands     ∼1306

Receive second data from the first user equipment via the
second set of carrier aggregation bands     ∼1308

End

FIG. 13

CARRIER AGGREGATION WITH UPLINK CARRIER SELECTION

CROSS-REFERENCE TO RELATED APPLICATION

This application is the U.S. national stage of PCT patent application number PCT/CN2020/108831 filed on Aug. 13, 2020.

TECHNICAL FIELD

The technology discussed below relates generally to wireless communication and, more particularly, to carrier aggregation with flexible selection of an uplink carrier.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station.

A base station may schedule access to a cell to support access by multiple UEs. For example, a base station may allocate different resources (e.g., time domain and frequency domain resources) for different UEs operating within a cell of the base station. A base station may schedule a UE to communicate with the base station on multiple carriers at the same time. This technique may be referred to as carrier aggregation.

As the demand for mobile access continues to increase, research and development continue to advance communication technologies, including technologies for enhancing mobile communication within a wireless communication network in particular, not only to meet the growing demand for mobile access, but to advance and enhance user experience associated with mobile communication.

Brief Summary of Some Examples

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure relate to carrier aggregation. In some examples, the selection of an uplink component carrier for the carrier aggregation may be flexible in the sense that the frequency band of the uplink component carrier need not be one of the frequency bands allocated for the downlink component carriers. Thus, in some aspects, an uplink component carrier may be decoupled from (e.g., independent of) the downlink carriers.

In some examples, a decision of whether to implement flexible uplink component carrier selection is based on traffic in a network. For example, a network operator may elect to use flexible uplink component carrier selection to support particular use cases. These use cases may relate to traffic requirements in a particular zone such as a city, a manufacturing plant, a hotel, and so on.

In some examples, the data throughput requirement for downlink traffic may be relatively high, but the component carriers selected for the downlink traffic to provide this throughput might not provide a desired level of service for the uplink traffic. In this case, by selecting one or more component carrier bands for the uplink traffic that are different from any of the component carrier bands selected for the downlink traffic, better overall communication performance may be achieved as compared to, for example, carrier aggregation schemes where the uplink component carriers are on the same bands as the downlink component carriers.

In some examples, a method of wireless communication at a user equipment may include determining a first set of carrier aggregation bands to be used for downlink transmissions from a base station, determining a second set of carrier aggregation bands to be used for uplink transmissions to the base station, receiving first data from the base station via the first set of carrier aggregation bands, and transmitting second data to the base station via the second set of carrier aggregation bands. The second set of carrier aggregation bands may include a first frequency band that is not in the first set of carrier aggregation bands.

In some examples, a user equipment may include a transceiver, a memory, and a processor communicatively coupled to the transceiver and the memory. The processor and the memory may be configured to determine a first set of carrier aggregation bands to be used for downlink transmissions from a base station, determine a second set of carrier aggregation bands to be used for uplink transmissions to the base station, receive first data from the base station via the transceiver on the first set of carrier aggregation bands, and transmit second data to the base station via the transceiver on the second set of carrier aggregation bands. The second set of carrier aggregation bands may include a first frequency band that is not in the first set of carrier aggregation bands.

In some examples, a user equipment may include means for determining a first set of carrier aggregation bands to be used for downlink transmissions from a base station, means for determining a second set of carrier aggregation bands to be used for uplink transmissions to the base station, means for receiving first data from the base station via the first set of carrier aggregation bands, and means for transmitting second data to the base station via the second set of carrier aggregation bands. The second set of carrier aggregation bands may include a first frequency band that is not in the first set of carrier aggregation bands.

In some examples, an article of manufacture for use by a user equipment includes a computer-readable medium having stored therein instructions executable by one or more processors of the user equipment to determine a first set of carrier aggregation bands to be used for downlink transmissions from a base station, determine a second set of carrier aggregation bands to be used for uplink transmissions to the base station, receive first data from the base station via the first set of carrier aggregation bands, and transmit second data to the base station via the second set of carrier aggregation bands. The second set of carrier aggregation bands may include a first frequency band that is not in the first set of carrier aggregation bands.

One or more of the following features may be applicable to any of the method, the apparatuses, and the computer-readable medium of the preceding paragraphs. The first set of carrier aggregation bands and the second set of carrier aggregation bands may constitute a first carrier aggregation configuration of a plurality of carrier aggregation configurations. The first carrier aggregation configuration may be selected based on traffic to be communicated by the user equipment. The traffic to be communicated by the user equipment may include traffic within a particular zone. The particular zone may include at least one of: a geographical area, a paging area, a network operator zone, a population district, a manufacturing zone, a hotel zone, a customer zone, or any combination thereof. The plurality of carrier aggregation configurations may include a third set of downlink carrier aggregation bands and a fourth set of uplink carrier aggregation bands. The fourth set of uplink carrier aggregation bands may be a subset of the third set of downlink carrier aggregation bands.

In some examples, a method of wireless communication at a base station may include determining a first set of carrier aggregation bands to be used for downlink transmissions, determining a second set of carrier aggregation bands to be used for uplink transmissions from a user equipment, transmitting first data to the user equipment via the first set of carrier aggregation bands, and receiving second data from the user equipment via the second set of carrier aggregation bands. The second set of carrier aggregation bands may include a first frequency band that is not in the first set of carrier aggregation bands.

In some examples, a base station may include a transceiver, a memory, and a processor communicatively coupled to the transceiver and the memory. The processor and the memory may be configured to determine a first set of carrier aggregation bands to be used for downlink transmissions, determine a second set of carrier aggregation bands to be used for uplink transmissions from a user equipment, transmit first data to the user equipment via the transceiver on the first set of carrier aggregation bands, and receive second data from the user equipment via the transceiver on the second set of carrier aggregation bands. The second set of carrier aggregation bands may include a first frequency band that is not in the first set of carrier aggregation bands.

In some examples, a base station may include means for determining a first set of carrier aggregation bands to be used for downlink transmissions, means for determining a second set of carrier aggregation bands to be used for uplink transmissions from a user equipment, means for transmitting first data to the user equipment via the first set of carrier aggregation bands, and means for receiving second data from the user equipment via the second set of carrier aggregation bands. The second set of carrier aggregation bands may include a first frequency band that is not in the first set of carrier aggregation bands.

In some examples, an article of manufacture for use by a base station includes a computer-readable medium having stored therein instructions executable by one or more processors of the base station to determine a first set of carrier aggregation bands to be used for downlink transmissions, determine a second set of carrier aggregation bands to be used for uplink transmissions from a user equipment, transmit first data to the user equipment via the first set of carrier aggregation bands, and receive second data from the user equipment via the second set of carrier aggregation bands. The second set of carrier aggregation bands may include a first frequency band that is not in the first set of carrier aggregation bands.

One or more of the following features may be applicable to any of the method, the apparatuses, and the computer-readable medium of the preceding paragraphs. The first set of carrier aggregation bands and the second set of carrier aggregation bands may constitute a first carrier aggregation configuration of a plurality of carrier aggregation configurations. The first carrier aggregation configuration may be selected based on traffic to be communicated by the user equipment. The traffic to be communicated by the user equipment may include traffic within a particular zone. The particular zone may include at least one of: a geographical area, a paging area, a network operator zone, a population district, a manufacturing zone, a hotel zone, a customer zone, or any combination thereof. The plurality of carrier aggregation configurations may include a third set of downlink carrier aggregation bands and a fourth set of uplink carrier aggregation bands. The fourth set of uplink carrier aggregation bands may be a subset of the third set of downlink carrier aggregation bands. Determining the first set of carrier aggregation bands may include selecting the first set of carrier aggregation bands. Determining the second set of carrier aggregation bands may include selecting the second set of carrier aggregation bands. Selecting the second set of carrier aggregation bands may be independent of the selecting of the first set of carrier aggregation bands. Selecting the second set of carrier aggregation bands may include determining that a larger coverage area than a threshold coverage area is needed for the uplink transmissions and selecting carrier aggregation for the uplink transmissions as a result of the determining that the larger coverage area than the threshold coverage area is needed for the uplink transmissions. Selecting the second set of carrier aggregation bands may include determining that a larger coverage area than a threshold coverage area is needed for the uplink transmissions and a higher throughput than a threshold throughput is needed for the downlink transmissions and selecting a first frequency band and a second frequency band for the second set of carrier aggregation bands as a result of the determining that the larger coverage area than the threshold coverage area is needed for the uplink transmissions and the higher throughput than the threshold throughput is needed for the downlink transmissions. Each of the first frequency band and the second frequency band may be lower in frequency than any frequency band of the first set of carrier aggregation bands.

These and other aspects of the disclosure will become more fully understood upon a review of the detailed description, which follows. Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

5

6

Figure 3:
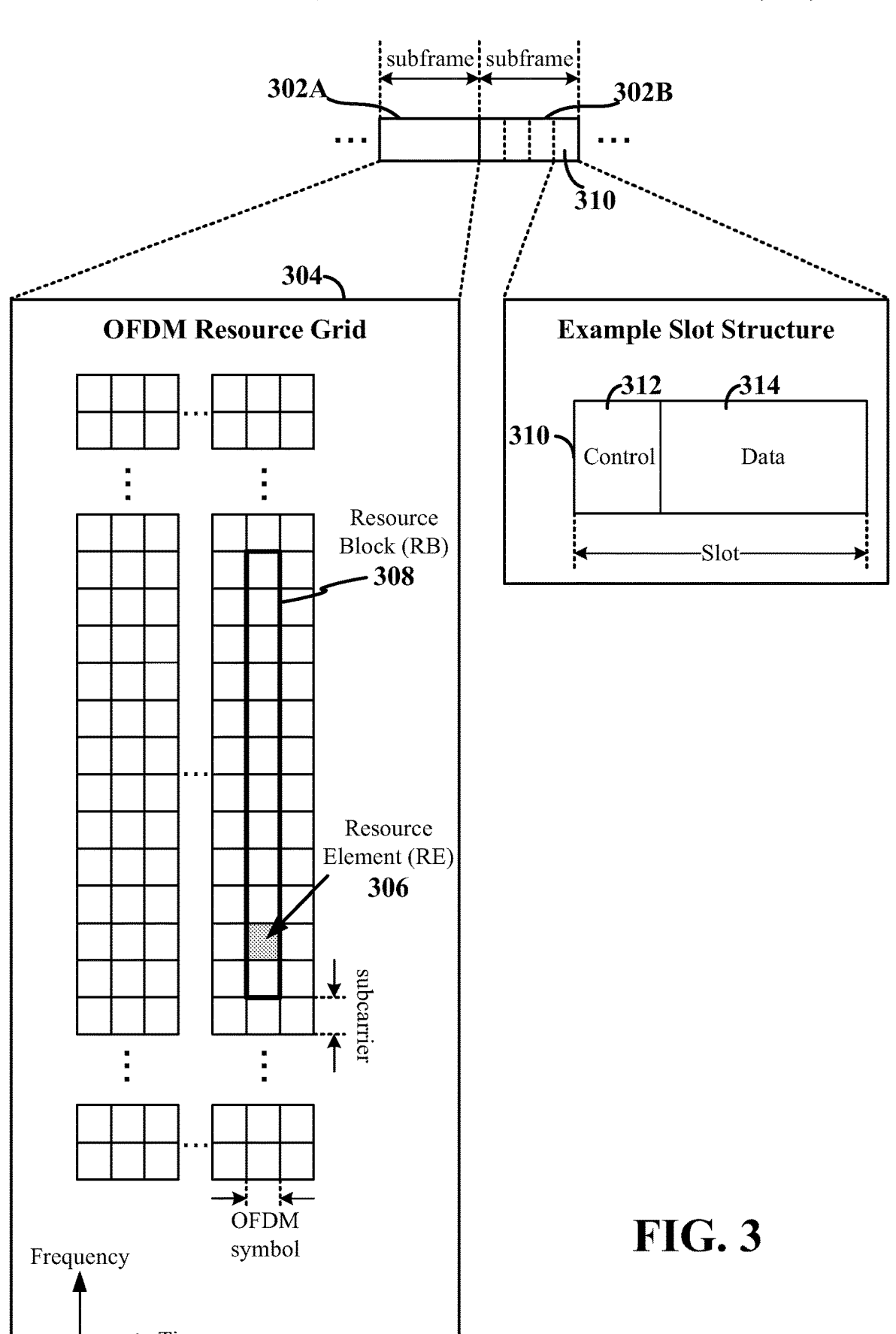

FIG. 3 is a schematic illustration of wireless resources in an air interface utilizing orthogonal frequency divisional multiplexing (OFDM) according to some aspects.

Figure 4:
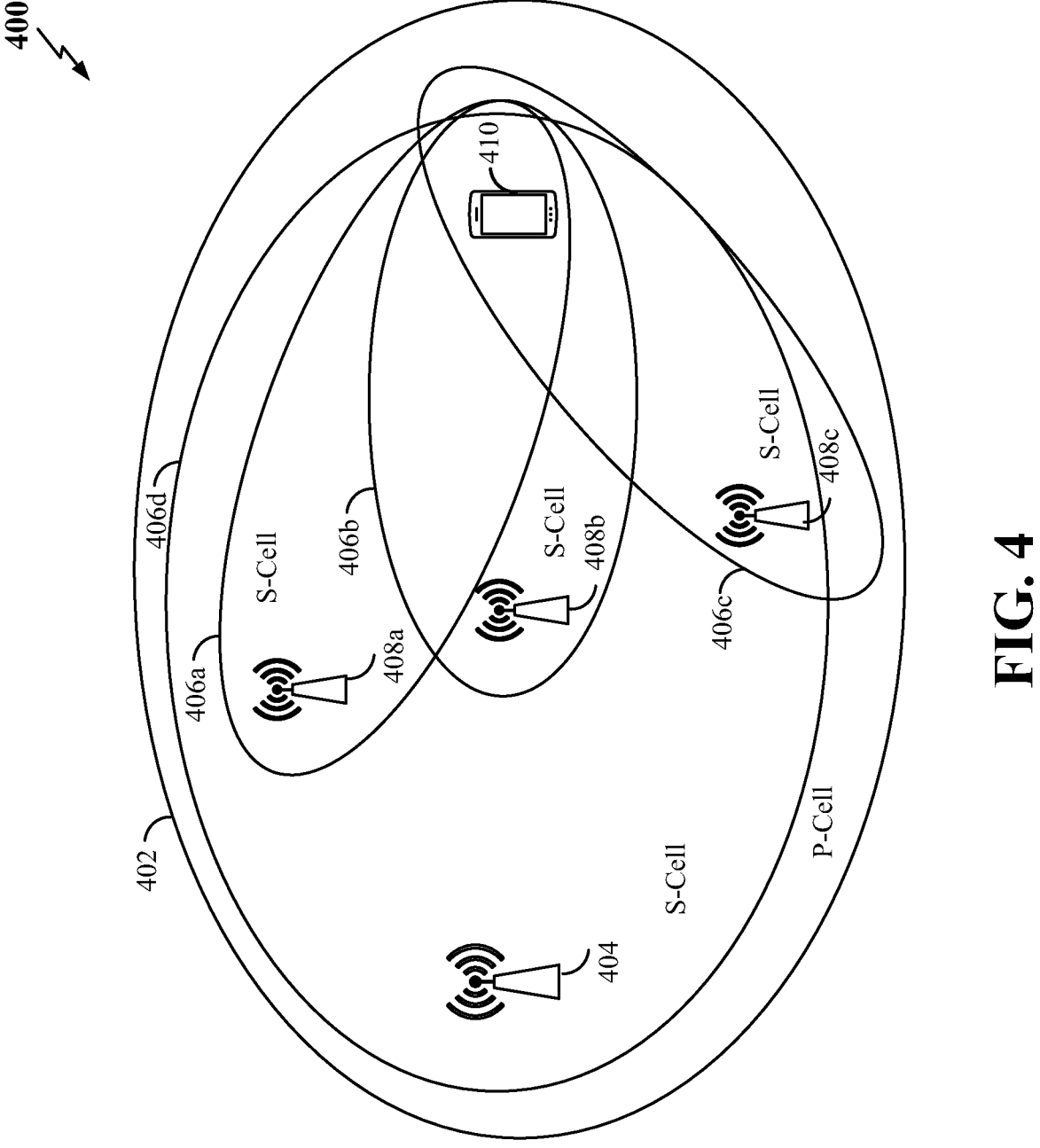

FIG. 4 is a conceptual illustration of a wireless communication via multiple radio frequency (RF) carriers according to some aspects.

FIG. 5 is a conceptual illustration of several RF bands according to some aspects.

FIG. 6 is a conceptual illustration of wireless communication using carrier aggregation according to some aspects.

Figure 7:
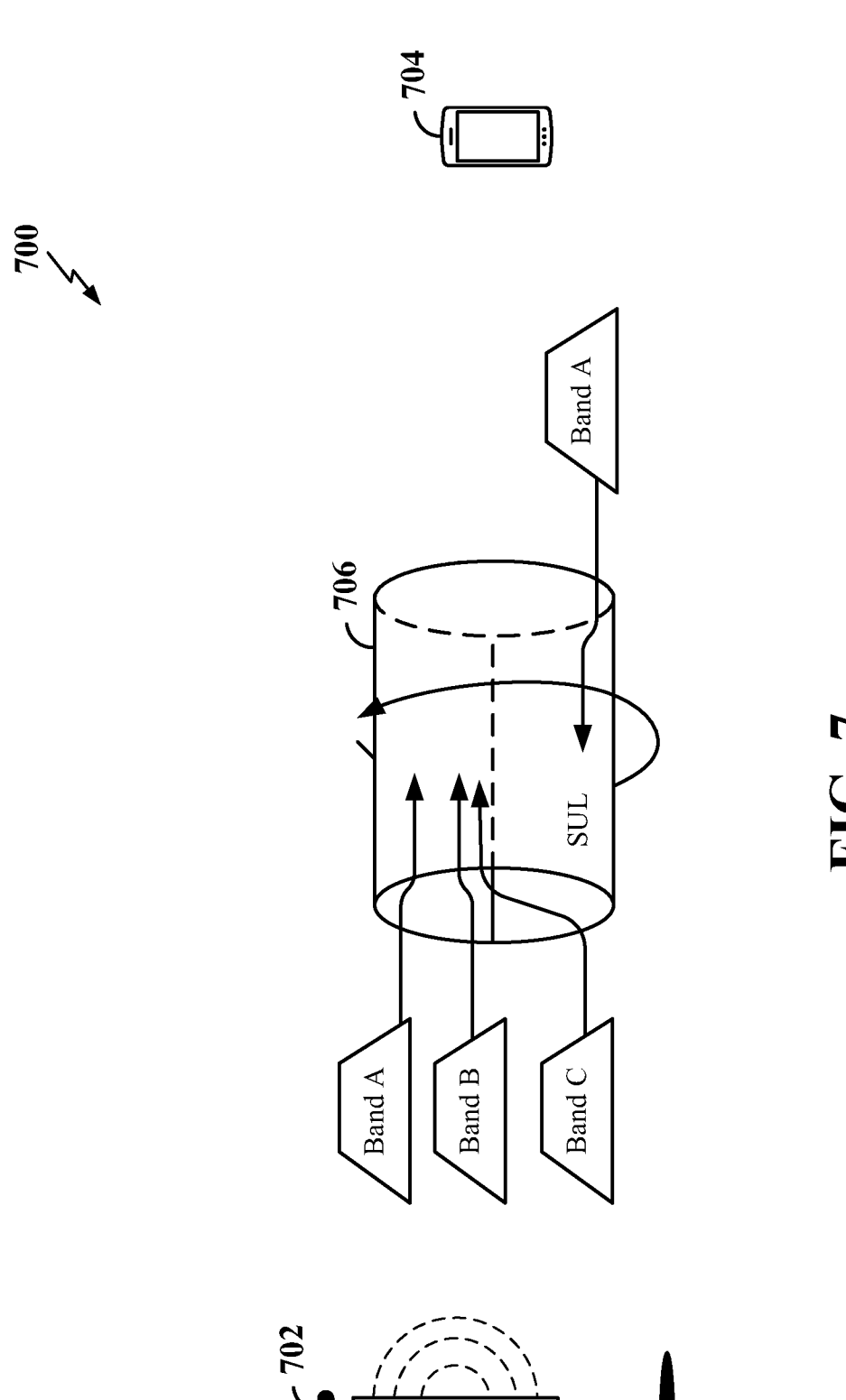

FIG. 7 is a conceptual illustration of wireless communication using a supplemental uplink according to some aspects.

Figure 8:
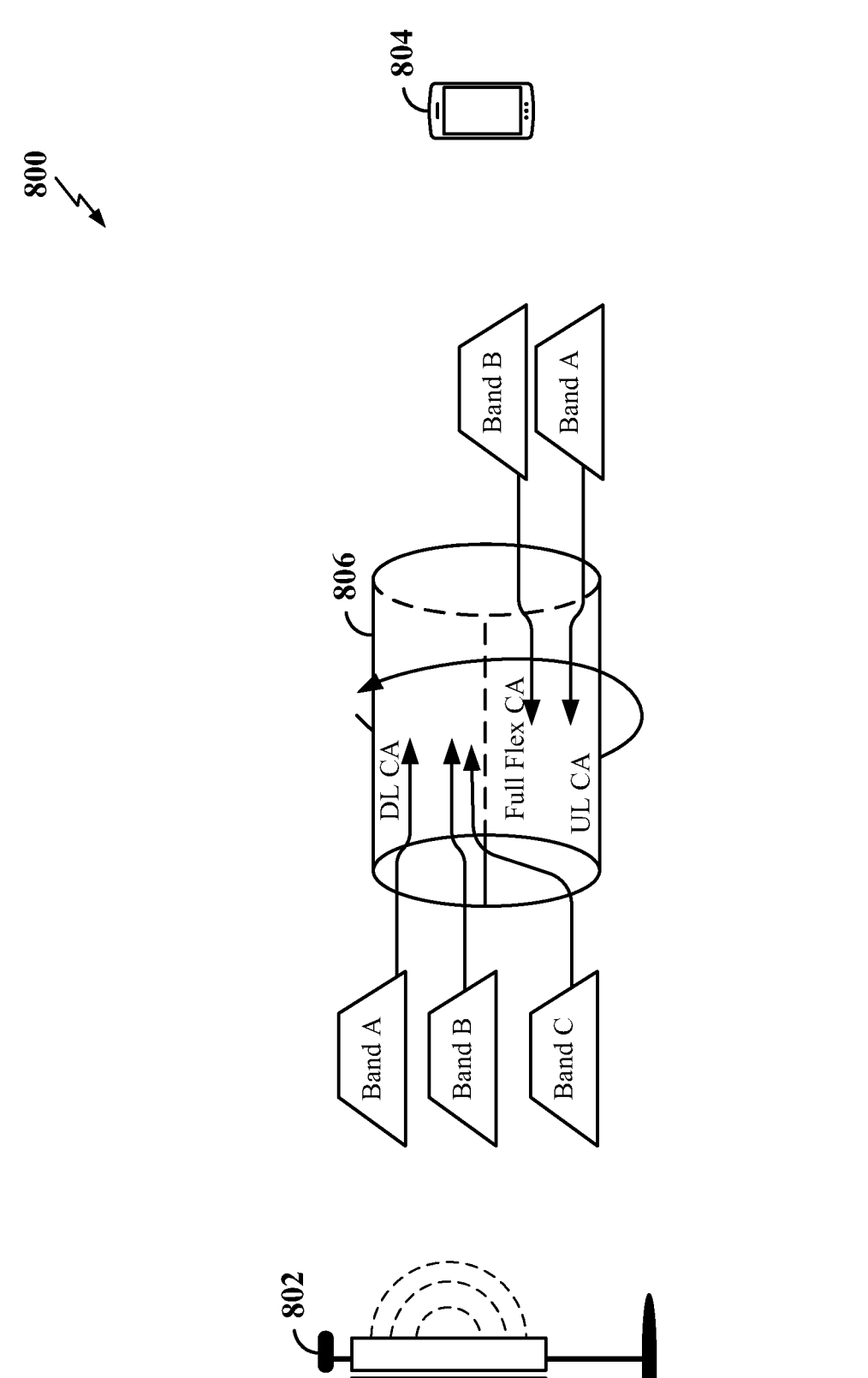

FIG. 8 is a conceptual illustration of wireless communication using carrier aggregation with flexible uplink selection according to some aspects.

Figure 9:
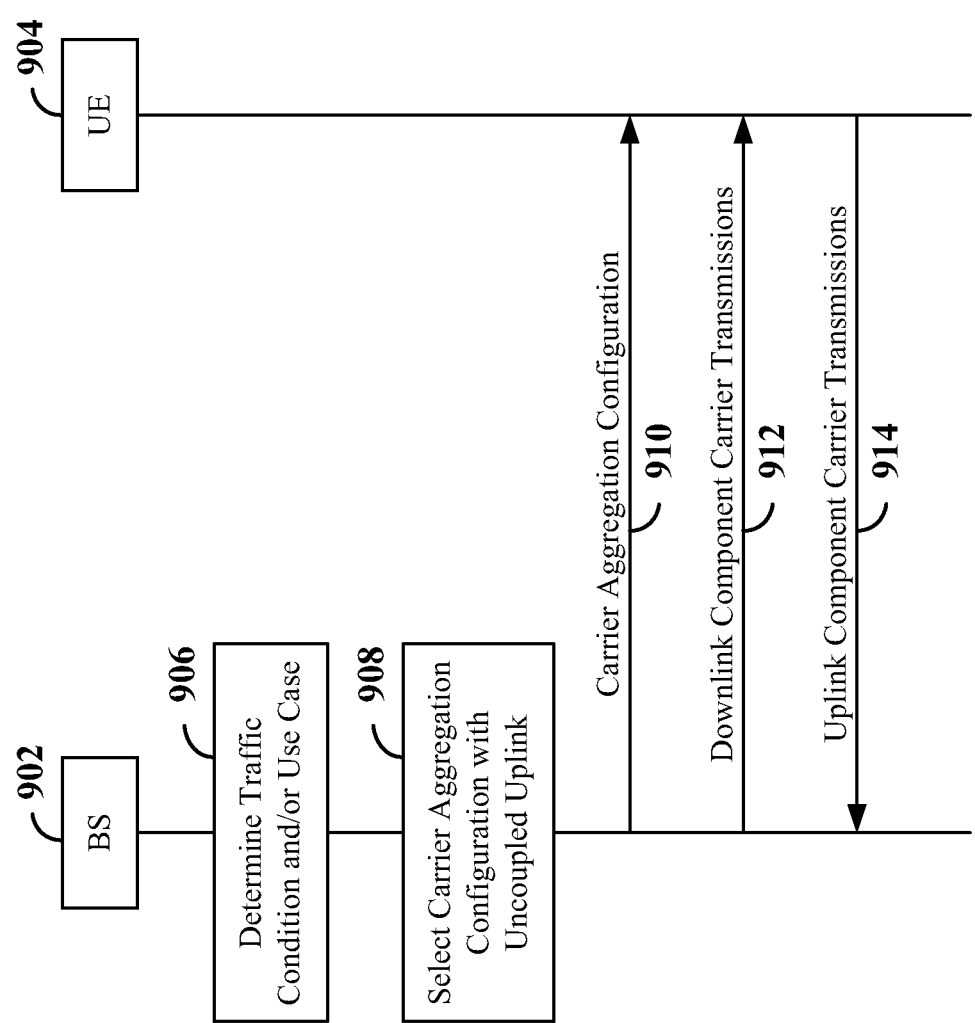

FIG. 9 is a signaling diagram of an example of carrier aggregation signaling according to some aspects.

Figure 10:
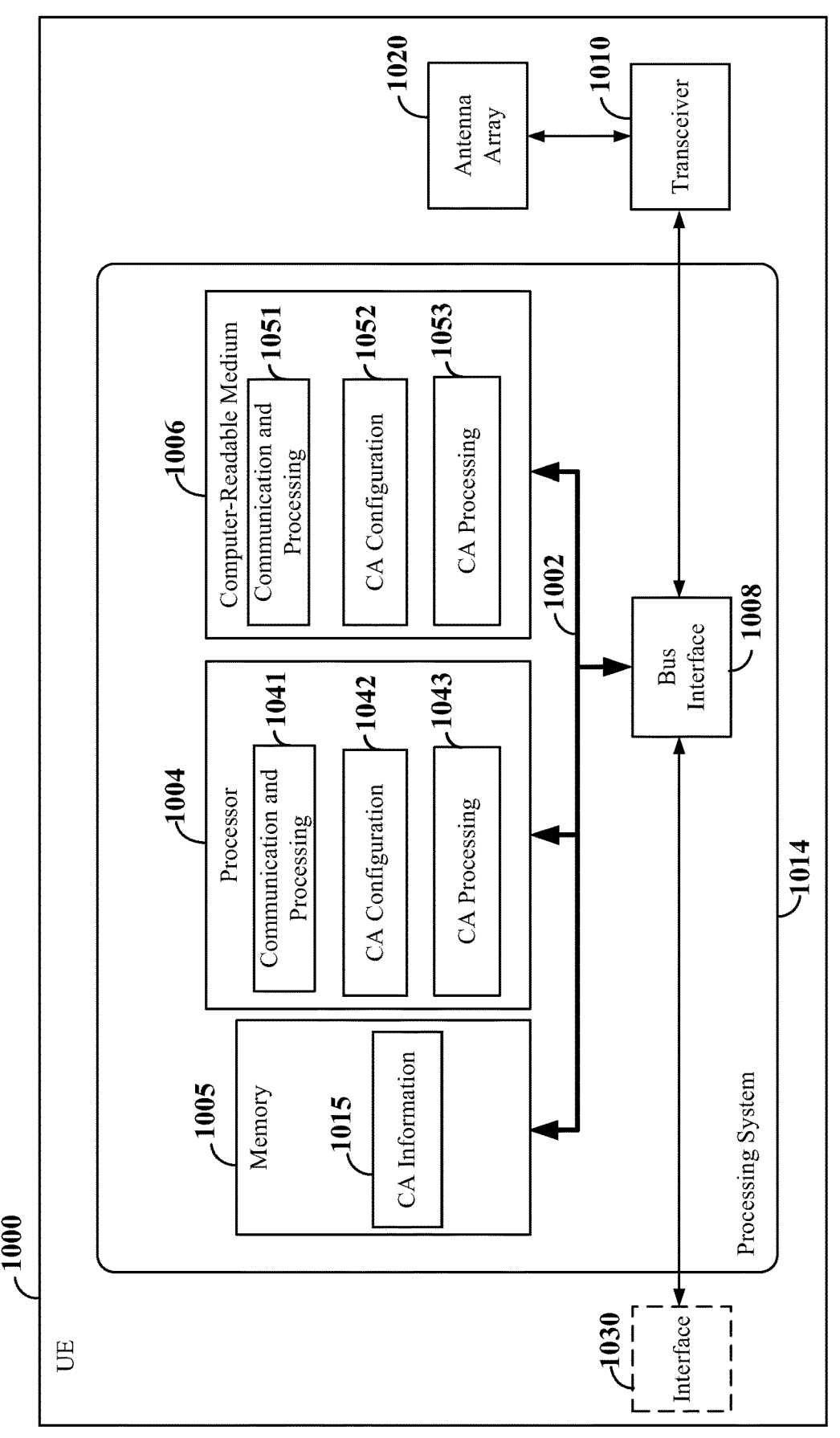

FIG. 10 is a block diagram illustrating an example of a hardware implementation for a UE employing a processing system according to some aspects.

FIG. 11 is a flow chart of an example carrier aggregation method according to some aspects.

Figure 12:
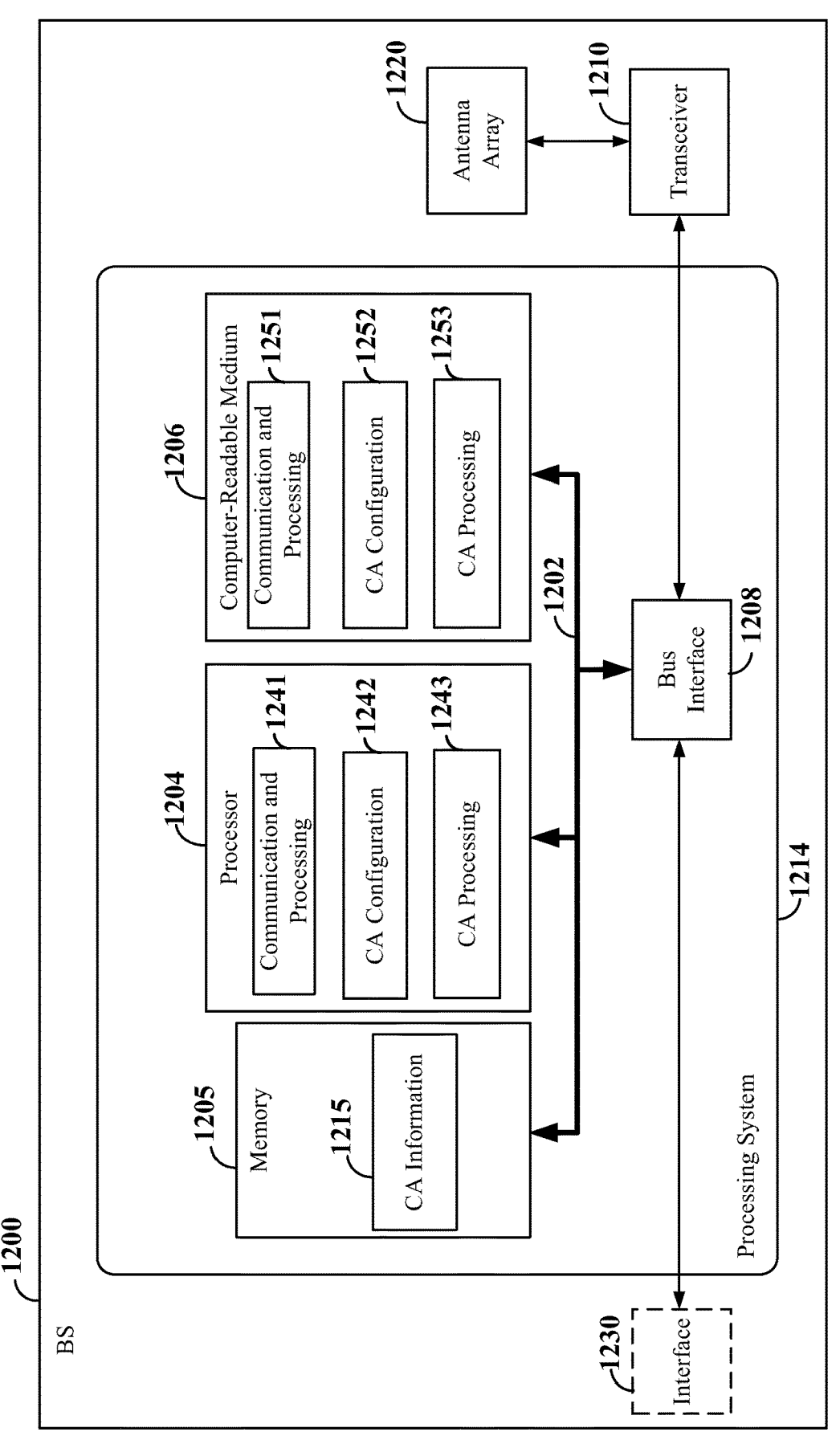

FIG. 12 is a block diagram illustrating an example of a hardware implementation for a base station employing a processing system according to some aspects.

FIG. 13 is a flow chart of an example carrier aggregation method according to some aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHZ) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

With the above aspects in mind, unless specifically stated otherwise, it should be understood that the term "sub-6 GHZ" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
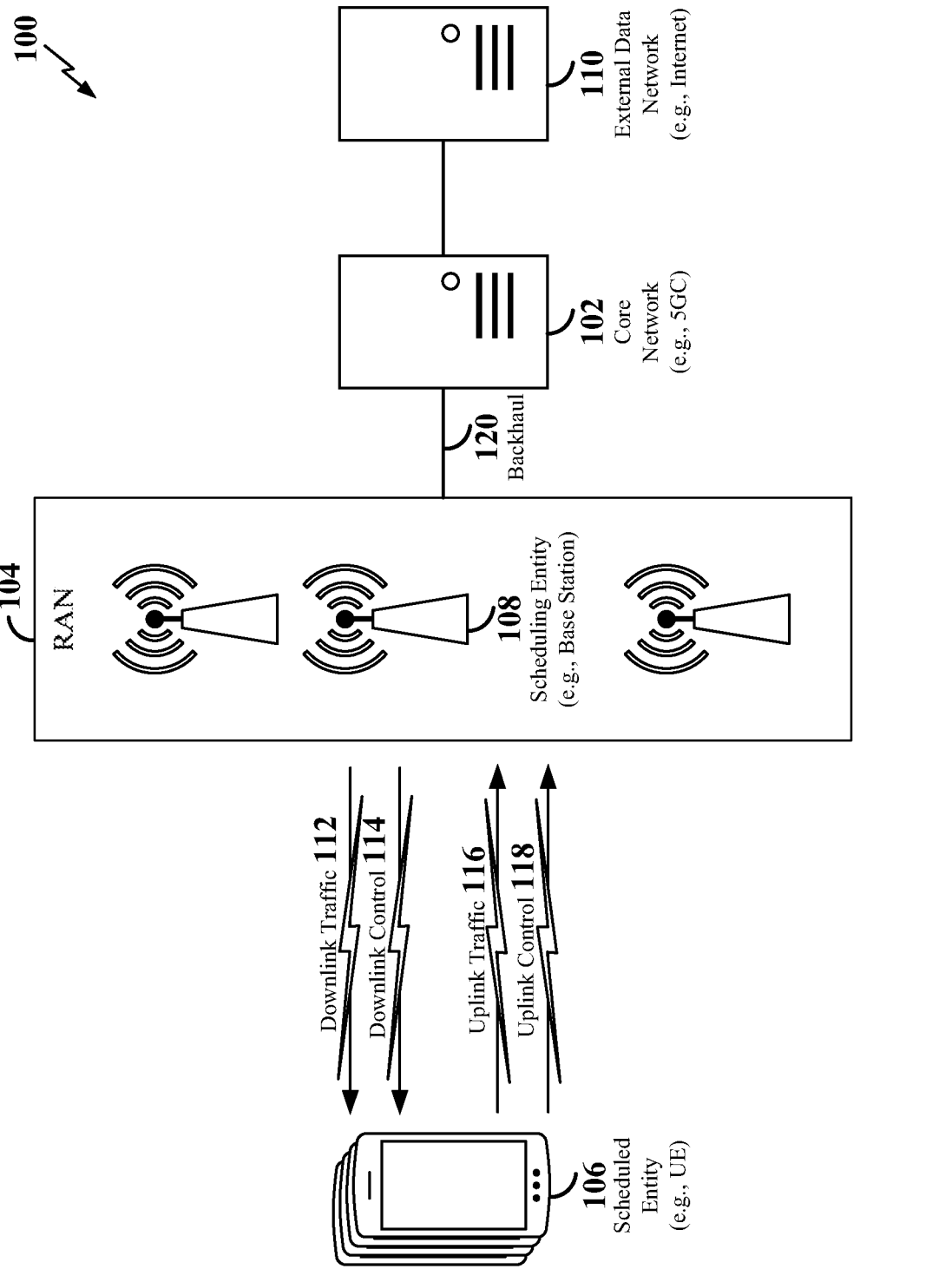
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a base station (BS) 108 in the discussion that follows. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
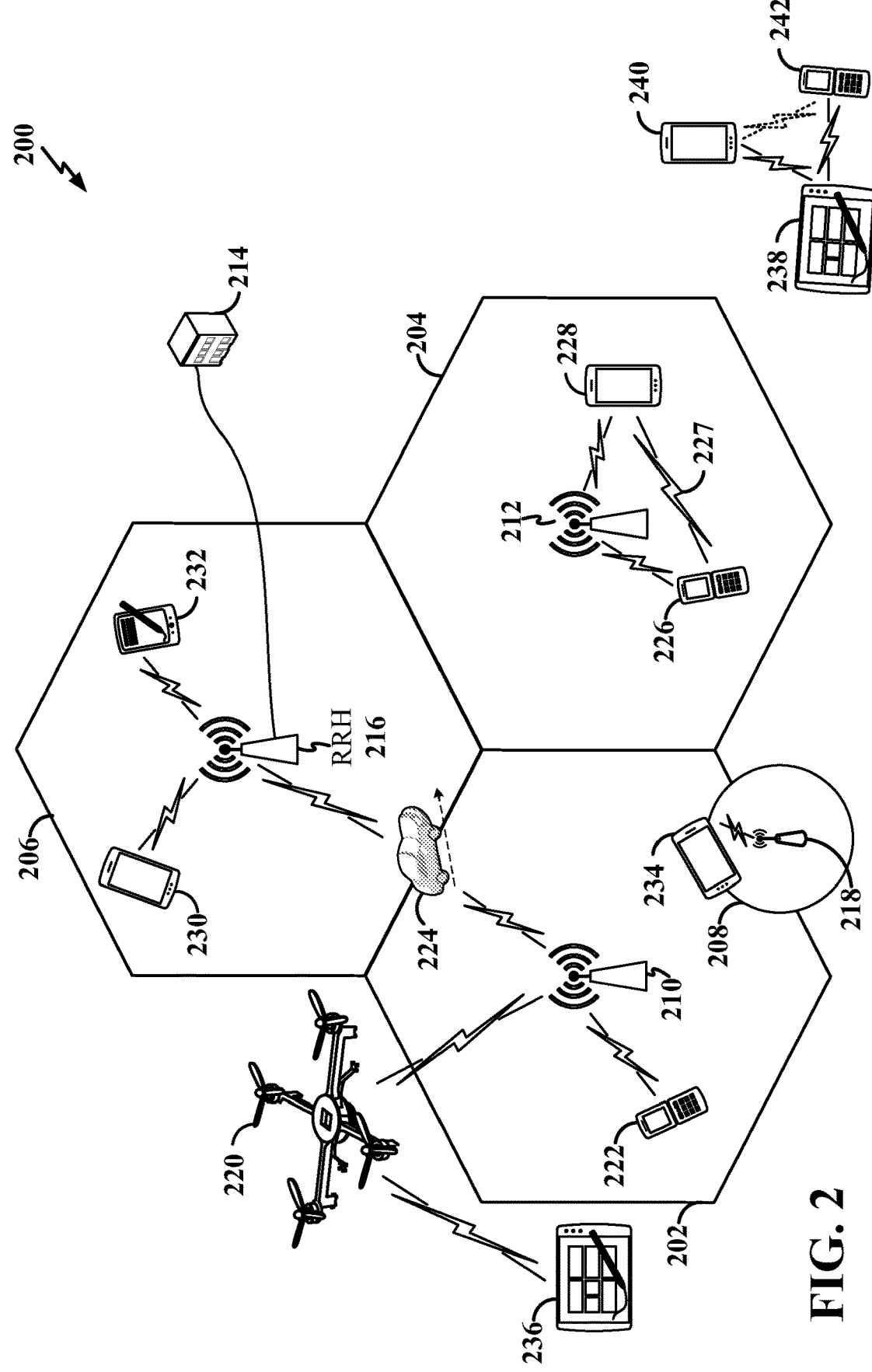
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network (e.g., as illustrated in FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210. In some examples, a UAV 220 may be configured to function as a BS. That is, in some examples, a cell may not necessarily be stationary, and the geographic area of the cell may move according to the location of a mobile base station such as a UAV 220.

In the radio access network 200, the ability for a UE to communicate while moving, independent of its location, is referred to as mobility. The various physical channels between the UE and the radio access network are generally set up, maintained, and released under the control of an access and mobility management function (AMF). The AMF (not shown in FIG. 2) may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancelation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the UE 238 (e.g., functioning as a scheduling entity). Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic (e.g., a physical sidelink shared channel) and sidelink control (e.g., a physical sidelink control channel).

In some examples, two or more UEs (e.g., UEs 226 and 228) within the coverage area of a serving base station 212 may communicate with both the base station 212 using cellular signals and with each other using direct link signals (e.g., sidelink signals 227) without relaying that communication through the base station. In an example of a V2X network within the coverage area of the base station 212, the base station 212 and/or one or both of the UEs 226 and 228 may function as scheduling entities to schedule sidelink communication between UEs 226 and 228.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example DL subframe (SF) 302A is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers. 5G NR supports a scalable numerology where different numerologies may be used for different radio frequency spectrums, different bandwidths, and the like. For example, sub-carrier spacings (SCSs) of 15 kHz, 30 kHz, 60 kHz, etc., may be used in different scenarios.

The resource grid 304 may be used to schematically represent time-frequency resources for a given antenna port.

That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink, uplink, or sidelink transmissions typically involves scheduling one or more resource elements 306 within one or more sub-bands or bandwidth parts (BWPs). Each BWP may include two or more contiguous or consecutive RBs. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, RSU, etc.) or may be self-scheduled by a UE implementing D2D sidelink communication.

In this illustration, the RB 308 is shown as occupying less than the entire bandwidth of the subframe 302A, with some subcarriers illustrated above and below the RB 308. In a given implementation, the subframe 302A may have a bandwidth corresponding to any number of one or more RBs 308. Further, in this illustration, the RB 308 is shown as occupying less than the entire duration of the subframe 302A, although this is merely one possible example.

Each 1 ms subframe 302A may consist of one or multiple adjacent slots. In the example shown in FIG. 3, one subframe 302B includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS), a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In some examples, a slot 310 may be utilized for broadcast or unicast communication. In V2X or D2D networks, a broadcast communication may refer to a point-to-multipoint transmission by a one device (e.g., a vehicle, base station (e.g., RSU, gNB, eNB, etc.), UE, or other similar device) to other devices. A unicast communication may refer to a point-to-point transmission by a one device to a single other device.

In an example, the control region 312 of the slot 310 may include a physical downlink control channel (PDCCH) including downlink control information (DCI) transmitted by a base station (e.g., gNB, eNB, RSU, etc.) towards one or more of a set of UEs, which may include one or more sidelink devices (e.g., V2X/D2D devices). In some examples, the DCI may include synchronization information to synchronize communication by a plurality of sidelink devices on the sidelink channel. In addition, the DCI may include scheduling information indicating one or more resource blocks within the control region 312 and/or data region 314 allocated to sidelink devices for sidelink communication. For example, the control region 312 of the slot may further include control information transmitted by sidelink devices over the sidelink channel, while the data region 314 of the slot 310 may include data transmitted by sidelink devices over the sidelink channel. In some examples, the control information may be transmitted within a physical sidelink control channel (PSCCH), while the data may be transmitted within a physical sidelink shared channel (PSSCH).

In a DL transmission, the transmitting device (e.g., the scheduling entity) may allocate one or more REs 306 (e.g., within a control region 312) to carry DL control information including one or more DL control channels, such as a PBCH; a physical control format indicator channel (PCFICH); a physical hybrid automatic repeat request (HARQ) indicator channel (PHICH); and/or a physical downlink control channel (PDCCH), etc., to one or more scheduled entities. The transmitting device may further allocate one or more REs 306 to carry other DL signals, such as a DMRS; a phase-tracking reference signal (PT-RS); a channel state information-reference signal (CSI-RS); a primary synchronization signal (PSS); and a secondary synchronization signal (SSS).

The synchronization signals PSS and SSS, and in some examples, the PBCH and a PBCH DMRS, may be transmitted in a synchronization signal block (SSB) that includes 3 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other nonlimiting examples may utilize greater or fewer than two synchronization signals; may include one or more supplemental channels in addition to the PBCH; may omit a PBCH; and/or may utilize a different number of symbols and/or nonconsecutive symbols for an SSB, within the scope of the present disclosure.

The SSB may be used to send system information (SI) and/or provide a reference to SI transmitted via another channel. Examples of system information may include, but are not limited to, subcarrier spacing, system frame number, a cell global identifier (CGI), a cell bar indication, a list of common control resource sets (coresets), a list of common search spaces, a search space for SIB1, a paging search space, a random access search space, and uplink configuration information. Two specific examples of coresets include PDCCH CORESET 0 and CORESET 1.

The SI may be subdivided into three sets referred to as minimum SI (MSI), remaining MSI (RMSI), and other SI (OSI). The PBCH may carry the MSI and some of the RMSI. For example, the PBCH may carry a master information block (MIB) that includes various types of system information, along with parameters for decoding a system information block (SIB). In some examples, the MIB may configure CORESET 0.

The RMSI may include, for example, a SystemInformationType1 (SIB1) that contains various additional system information. The RMSI may be carried by a PDSCH (e.g., at a dedicated CORESET 0).

The PCFICH provides information to assist a receiving device in receiving and decoding the PDCCH. The PDCCH may carry downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a PDSCH; or for an UL transmission, a physical uplink shared channel (PUSCH). In some examples, one or more REs 306 within the data region 314 may be configured to carry SIBs (e.g., SIB1), carrying system information that may enable access to a given cell.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

5G-NR networks may further support carrier aggregation (CA) of component carriers transmitted from different cells and/or different transmission and reception points (TRPs) in a multi-cell transmission environment. The different TRPs may be associated with a single serving cell or multiple serving cells. In some aspects, the term component carrier may refer to a carrier frequency (or band) utilized for communication within a cell.

FIG. 4 is a conceptual illustration of a wireless communication system that shows a base station (BS) and a user equipment (UE) communicating via multiple carriers according to some aspects of the disclosure. In particular, FIG. 4 shows an example of a wireless communication system 400 that includes a primary serving cell (PCell) 402 and one or more secondary serving cells (SCells) 406a, 406b, 406c, and 406d. The PCell 402 may be referred to as the anchor cell that provides a radio resource control (RRC) connection to the UE 410. In some examples, the PCell and the SCell may be co-located (e.g., different TRPs at the same location).

When carrier aggregation is configured in this scenario, one or more of the SCells 406a-406d may be activated or added to the PCell 402 to form the serving cells serving the UE 410. Each serving cell corresponds to a component carrier (CC). The CC of the PCell 402 may be referred to as a primary CC, and the CC of a SCell 406a-406d may be referred to as a secondary CC. The PCell 402 and one or more of the SCells 406 may be served by a respective base station 404 and 408a-408c or scheduling entity similar to those illustrated in any of FIGS. 1 and 2. In the example shown in FIG. 4, SCells 406a-406c are each served by a respective base station 408a-408c. SCell 406d is co-located with the PCell 402. For example, the base station 404 may include multiple TRPs, each supporting a different carrier. The coverages of the PCell 402 and SCell 406d may differ since component carriers in different frequency bands may experience different path loss.

In some examples, the PCell 402 may add or remove one or more of the SCells 406a-406d to improve reliability of the connection to the UE 410 and/or increase the data rate. The PCell 402 may be changed upon a handover to another PCell.

In some examples, the PCell 402 may utilize a first radio access technology (RAT), such as LTE, while one or more of the SCells 406 may utilize a second RAT, such as 5G-NR. In this example, the multi-cell transmission environment may be referred to as a multi-RAT-dual connectivity (MR-DC) environment. On example of MR-DC is Evolved-Universal Terrestrial Radio Access Network-New Radio dual connectivity (EN-DC) mode that enables a UE to simultaneously connect to an LTE base station and a NR base station to receive data packets from and send data packets to both the LTE base station and the NR base station.

In some examples, the PCell 402 may be a low band cell, and the SCells 406 may be high band cells. A low band (LB) cell uses a CC in a frequency band lower than that of the high band cells. For example, the high band cells may use millimeter wave (mmW) CC, and the low band cell may use a CC in a band (e.g., sub-6 GHZ band) lower than mmW. In general, a cell using a mmW CC can provide greater bandwidth than a cell using a low band CC. In addition, when using a frequency carrier that is above 6 GHz (e.g., mmW), beamforming may be used to transmit and receive signals in some examples.

A network operator (which may be referred to as a "network carrier" or simply a "carrier") may be authorized to operate on different RF bands (hereafter, "bands"). These bands may be specified by licensing authorities in different countries, with certain center frequencies and bandwidths. In some examples, a network operator may be licensed to use several 5G NR bands. In use, different 5G NR bands may have different bandwidths, different coverages, and different throughput performances.

As one example, FIG. 5 illustrates bands that may be assigned to China Mobile Communications Corporation (CMCC). An n79 band may support, for example, a 100 MHz TDD band with 70 MHz allocated for downlink (DL) transmissions and 30 MHz allocated for uplink (UL) transmissions. The n79 band also may support, for example, a 100 MHz TDD band with 80 MHz allocated for DL transmissions and 20 MHz allocated for UL transmissions. An n41 band may support, for example, a 60 MHz TDD band with 48 MHz allocated for DL transmissions and 12 MHz allocated for UL transmissions. An n40 band may support, for example, a 50 MHz TDD band with 10 MHz allocated for DL transmissions and 40 MHz allocated for UL transmissions. An n28 band may support, for example, two 30 MHz FDD bands, where one band is allocated for DL transmissions and the other band is allocated for UL transmissions. Other bandwidth allocations are possible in these bands.

Another network operator may be authorized to operate on another set of bands. For example, China Telecom (CT) or China Unicom (CU) may be licensed to use an n78 band, an n1 band, an n3 band, and an n5 band.

Network operators may use these bands in flexible ways to meet different use cases. For example, different DL/UL combinations may be used to support one or more of: heavy DL traffic, heavy UL traffic, UL coverage requirements, throughput enhancements, or a combination thereof.

The currently available UL solutions may limit the ability of a network operator to provide a desired level of UL service. Carrier aggregation (CA) allows UL transmissions in one band or in multiple bands. However, the UL bands must be a subset of the DL bands or the same bands as the DL bands. Supplementary uplink (SUL) allows an UL band and a DL band to be configured separately. However, with SUL, a UE is only allowed to use one UL band for transmissions at a time.

FIG. 6 is a conceptual illustration of a wireless communication system 600 that includes a base station (BS) 602 and a UE 604 that use carrier aggregation according to some aspects. In some examples, the base station 602 may correspond to any of the base stations or scheduling entities shown in any of FIGS. 1, 2, 4, 7, 8, 9, and 12. In some examples, the UE 604 may correspond to any of the UEs or scheduled entities shown in any of FIGS. 1, 2, 4, 7, 8, 9, and 10.

In the example of FIG. 6, the BS 602 and the UE 604 communication via a wireless communication medium 606 (represented, for convenience, by a cylinder). The BS 602 is shown transmitting in the downlink on one or more of a first component carrier, a second component carrier, and a third component carrier that use Band A, Band B, and Band C, respectively. The UE 604 is shown transmitting in the uplink on one or more of a first component carrier and a second component carrier, that use Band A and Band B, respectively. Other DL bands and/or UL bands may be used in other examples.

As mentioned above, in carrier aggregation, the UE 604 may use one band for UL transmissions or multiple bands for UL transmissions. The UL bands used by the UE 604 for its UL carrier aggregation transmissions must be subset of the DL bands or the same bands as these DL bands.

Given the set of possible DL bands: Band A, Band B, and Band C, the UE 604 may be restricted to the following carrier aggregation band combinations. For the UE 604 to use Band A on the UL, then the DL must use Band A, Bands A+B, Bands A+C, or Bands A+B+C. For the UE 604 to use Band B on the UL, then the DL must use Band B, Bands A+B, Bands B+C, or Bands A+B+C. For the UE 604 to use Bands A+B on the UL, then DL must use Bands A+B or Bands A+B+C. For the UE 604 to use Bands A+B+C on the UL, then DL must use A+B+C.

FIG. 7 is a conceptual illustration of a wireless communication system 700 that includes a base station (BS) 702 and a UE 704 that use a supplementary uplink (SUL) according to some aspects. In some examples, the base station 702 may correspond to any of the base stations or scheduling entities shown in any of FIGS. 1, 2, 4, 6, 8, 9, and 12. In some examples, the UE 704 may correspond to any of the UEs or scheduled entities shown in any of FIGS. 1, 2, 4, 6, 8, 9, and 10.

In the example of FIG. 7, the BS 702 and the UE 704 communication via a wireless communication medium 706. The BS 702 is shown transmitting in the downlink on one or more of a first component carrier, a second component carrier, and a third component carrier that use Band A, Band B, and Band C, respectively. The UE 704 is shown transmitting in the uplink on a first component carrier that uses Band A. Other DL bands and/or UL bands may be used in other examples.

As mentioned above, in an SUL scheme, UL bands and DL bands may be configured separately. For example, the UL bands used by the UE 704 for its UL transmissions need not be subset of the DL bands and need not be the same bands as these DL bands. However, the UE 704 is only allowed to transmit on one band in the UL at a time.

Given the set of possible DL bands: Band A, Band B, and Band C, the UE 704 may use any of the following SUL band combinations. When the UE 704 uses Band A for the UL, the DL may use any of Band A, Band B, Band C, Bands A+B, Bands A+C, Bands B+C, or Bands A+B+C. When the UE 704 uses Band B for the UL, the DL may use any of Band A, Band B, Band C, Bands A+B, Bands A+C, Bands B+C, or Bands A+B+C. When the UE 704 uses Band C for the UL, the DL may use any of Band A, Band B, Band C, Bands A+B, Bands A+C, Bands B+C, or Bands A+B+C.

FIG. 8 is a conceptual illustration of a wireless communication system 800 that includes a base station (BS) 802 and a UE 804 that use carrier aggregation with flexible uplink selection according to some aspects. In some examples, the base station 802 may correspond to any of the base stations or scheduling entities shown in any of FIGS. 1, 2, 4, 6, 7, 9, and 12. In some examples, the UE 804 may correspond to any of the UEs or scheduled entities shown in any of FIGS. 1, 2, 4, 6, 7, 9, and 10.

In the example of FIG. 8, the BS 802 and the UE 804 communication via a wireless communication medium 806. The BS 802 is shown transmitting in the downlink on one or more of a first component carrier, a second component carrier, and a third component carrier that use Band A, Band B, and Band C, respectively. The UE 804 is shown transmitting in the uplink on one or more of a first component carrier and a second component carrier, that use Band A and Band B, respectively. Other DL bands and/or UL bands may be used in other examples.

In a carrier aggregation with flexible uplink selection scheme, UL transmissions are allowed in multiple bands with full flexibility on the UL band and DL band combinations. For example, such a scheme may support the following combinations (in the three band scenario) in addition to the combinations allowed in the carrier aggregation scheme of FIG. 6. When the UE 704 uses Bands A+B for the UL, the DL may use any of Band A, Band B, Band C, Bands A+C, or Bands B+C (in addition to Bands A+B or Bands A+B+C allowed under the carrier aggregation scheme of FIG. 6). When the UE 704 uses Bands B+C for the UL, the DL may use any of Band A, Band B, Band C, Bands A+B, or Bands A+C (in addition to Bands B+C or Bands A+B+C allowed under the carrier aggregation scheme of FIG. 6). When the UE 704 uses Bands A+B+C for the UL, the DL may use any of Band A, Band B, Band C, Bands A+B, Bands A+C, or Bands B+C (in addition to Bands A+B+C allowed under the carrier aggregation scheme of FIG. 6).

The disclosure thus relates in some aspect to supporting multiple band transmissions on the UL with full flexibility for the DL band and the UL band combinations. In some examples, existing bands (e.g., bands defined for 5G NR and/or LTE) may be used to provide flexible carrier aggregation service. Several examples of band combinations for the network operators discussed above follow. Other band combinations may be used in other examples.

For the CT/CU network operators, the following band combinations may be used in a carrier aggregation scheme according to the disclosure. In some examples, the UL may use the n1 band and the n3 band, while the DL may use a first n78 band and a second n78 band. In some examples, the UL may use the n1 band and the n3 band, while the DL may use a first n78 band, a second n78 band, an n1 band and/or an n3 band. Other band combinations may be used in other examples.

For the CMCC network operator, the following band combinations may be used in a carrier aggregation scheme according to the disclosure. In some examples, the UL may use the n41 band and the n28 band, while the DL may used the n79 band and the n41band. In some examples, the UL may use the n40 band and the n28 band, while the DL may used the n79 band and the n41band. In some examples, the UL may use the n41 band and the n28 band, while the DL may used the n79 band, a first n41band and a second n41 band. Other band combinations may be used in other examples.

Carrier aggregation with flexible UL scheduling may be used in a variety of use cases. For example, the band combinations set forth above (e.g., flexible band deployments on the n40+n28 bands and the n79+n41 bands, such as using n40+n28 bands for the UL and n79+n41 bands for the DL) may be used in mixed vertical industry applications, hotels, population areas (e.g., cites, town, etc.), customer sites, paging areas, and factories, as but a few examples.

As one example, carrier aggregation with flexible UL scheduling may be used in a scenario where it is desirable to improve UL performance (e.g., for vertical IoT use cases with a hierarchy of communication devices) while also supporting a high DL throughput. In this case, it may be desirable to employ two or more UL component carriers, without any restriction on whether the UL bands are the same as the DL bands. Here, it may be desirable to avoid such a restriction since the restriction could prevent the network operator from providing the desired level of performance on the UL due to, for example, limitations on the DL-centric bands with respect to UL traffic.

As another example, carrier aggregation with flexible UL scheduling may be used in a scenario where it is desirable to improve UL coverage while also supporting a high DL throughput. In this case, it may be desirable to employ at least one lower frequency UL component carrier (e.g., in a band at or near LTE bands). Here, since the DL may need to use higher frequency bands to provide the desired throughput, decoupling the UL and DL carrier aggregation bands enables the desired level of service for both the UL and the DL.

In some examples, a network operator may define several carrier aggregation configurations. These carrier aggregation configurations may include conventional carrier aggregation UL and DL band combinations as well as carrier aggregation UL and DL band combinations with flexible UL (e.g., decoupled UL and DL bands) as discussed herein. Thus, in some deployments (e.g., UL-centric use cases), a base station may select a carrier aggregation configuration with flexible UL, while in other deployments (e.g., DL-centric use cases), a base station may select a conventional carrier aggregation configuration. The selection of a particular carrier aggregation configuration may depend on criteria such as traffic in the network (e.g., traffic at a base station or at one or more UEs), customer requirements, user density, traffic types (e.g., UL, DL, broadcast, etc.), traffic symmetry, traffic asymmetry, as but a few examples.

FIG. 9 is a signaling diagram 900 illustrating an example of signaling for a carrier aggregation method in a wireless communication system including a base station (BS) 902 and a UE 904. In some examples, the base station 902 may correspond to any of the base stations or scheduling entities shown in any of FIGS. 1, 2, 4, 6, 7, 8, 9, and 12. In some examples, the UE 904 may correspond to any of the UEs or scheduled entities shown in any of FIGS. 1, 2, 4, 6, 7, 8, 9, and 10.

At step 906 of FIG. 9, the BS 902 determines a current or expected traffic condition and/or a use case that may affect the selection of a carrier aggregation configuration. For example, the base station may determine that it is located at an industrial site that supports multiple applications with different requirements (e.g., industrial applications with a vertical workflow such as, for example, an assembly line or hierarchical processing).

At step 908, the BS 902 selects a carrier aggregation configuration from a set of carrier aggregation configurations. This selection may be based on the traffic condition and/or the use case of step 906. The set of carrier aggregation configurations may include, for example, a first carrier aggregation configuration with flexible UL (e.g., with a first set of band combinations), a second carrier aggregation configuration with flexible UL (e.g., with a second set of band combinations), a third carrier aggregation configuration (e.g., a conventional carrier aggregation configuration with a third set of band combinations), a fourth carrier aggregation configuration (e.g., a conventional carrier aggregation configuration with a fourth set of band combinations), and so on. Thus, the BS 902 may select the carrier aggregation configuration that provides the best service for the traffic condition and/or use case.

At step 910, the BS 902 sends an indication of the selected carrier aggregation configuration to the UE 904. For example, the BS 902 may transmit a grant to the UE 904 that schedules resources for a set of component carriers according to the selected carrier aggregation configuration.

At step 912, the BS 902 transmits DL transmissions via the DL component carriers (DL carrier aggregation carriers). In addition, at step 914, the UE 904 transmits UL transmissions via the UL component carriers (UL carrier aggregation carriers).

FIG. 10 is a block diagram illustrating an example of a hardware implementation for a UE 1000 employing a processing system 1014. For example, the UE 1000 may be a sidelink device or other device configured to wirelessly communicate with a base station, as discussed in any one or more of FIGS. 1-9. In some implementations, the UE 1000 may correspond to any of the UEs or scheduled entities shown in any of FIG. 1, 2, 4, 6, 7, 8, or 9.

In accordance with various aspects of the disclosure, an element, or any portion of an element, or any combination of elements may be implemented with the processing system 1014. The processing system 1014 may include one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1000 may be configured to perform any one or more of the functions described herein. That is, the processor 1004, as utilized in a UE 1000, may be used to implement any one or more of the processes and procedures described herein.

The processor 1004 may in some instances be implemented via a baseband or modem chip and in other implementations, the processor 1004 may itself comprise a number of devices distinct and different from a baseband or modem chip (e.g., in such scenarios as may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010 and between the bus 1002 and an interface 1030. The transceiver 1010 provides a communication interface or means for communicating with various other apparatus over a wireless transmission medium. In some examples, the UE may include two or more transceivers 1010, each configured to communicate with a respective network type (e.g., terrestrial or non-terrestrial). The interface 1030 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1030 may include a user interface (e.g., keypad, display, speaker, microphone, joystick). Of course, such a user interface is optional, and may be omitted in some examples, such as an IoT device.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1000 may be configured to perform any one or more of the operations described herein (e.g., as described above in conjunction with FIGS. 1-9 and as described below in conjunction with FIG. 11). In some aspects of the disclosure, the processor 1004, as utilized in the UE 1000, may include circuitry configured for various functions.

The processor 1004 may include communication and processing circuitry 1041. The communication and processing circuitry 1041 may be configured to communicate with a base station, such as a gNB. The communication and processing circuitry 1041 may include one or more hardware components that provide the physical structure that performs various processes related to wireless communication (e.g., signal reception and/or signal transmission) as described herein. The communication and processing circuitry 1041 may further include one or more hardware components that provide the physical structure that performs various pro- cesses related to signal processing (e.g., processing a received signal and/or processing a signal for transmission) as described herein. In some examples, the communication and processing circuitry 1041 may include two or more transmit/receive chains, each configured to process signals in a different RAT (or RAN) type. The communication and processing circuitry 1041 may further be configured to execute communication and processing software 1051 included on the computer-readable medium 1006 to imple- ment one or more functions described herein.

In some examples, the communication and processing circuitry 1041 may be configured to receive and process downlink beamformed signals at a mmWave frequency or a sub-6 GHz frequency via the transceiver 1010 and an antenna array 1020. For example, the communication and processing circuitry 1041 may be configured to receive a respective reference signal (e.g., SSB or CSI-RS) on each of a plurality of downlink beams from the base station during a downlink beam sweep via at least one first antenna panel of the antenna array 1020. The communication and process- ing circuitry 1041 may further be configured to transmit a beam measurement report to the base station.

In some examples, the communication and processing circuitry 1041 may further be configured to generate and transmit uplink beamformed signals at a mmWave fre- quency or a sub-6 GHz frequency via the transceiver 1010 and the antenna array 1020. For example, the communica- tion and processing circuitry 1041 may be configured to transmit a respective reference signal (e.g., SRS or DMRS) on each of a plurality of uplink beams to the base station during an uplink beam sweep via at least one second antenna panel of the antenna array 1020.

The communication and processing circuitry 1041 may further be configured to control the antenna array 1020 and the transceiver 1010 to search for and identify a plurality of downlink transmit beams during a downlink beam sweep. The communication and processing circuitry 1041 may further be configured to obtain a plurality of beam measure- ments on each of a plurality of downlink receive beams via the antenna array 1020 for each of the identified downlink transmit beams. The communication and processing cir- cuitry 1041 may further be configured to generate a beam measurement report for transmission to the base station using the communication and processing circuitry 1041.

The communication and processing circuitry 1041 may further be configured to identify one or more selected uplink beam(s) based on the beam measurements obtained from the downlink beam reference signals. In some examples, the communication and processing circuitry 1041 may be con- figured to compare the respective RSRP (or other beam measurement) measured on each of the downlink receive beams for each of the serving downlink transmit beams to identify the serving downlink receive beams and to further utilize the serving downlink receive beams as the selected uplink transmit beams. Each serving downlink receive beam may have the highest measured RSRP (or other beam measurement) for one of the downlink transmit beams.

The communication and processing circuitry 1041 may be configured to generate one or more uplink transmit beams for transmission in an uplink beam sweep. Each uplink transmit beam may carry an uplink reference signal (e.g., an SRS) for measurement by the base station. The communication and processing circuitry 1041 may further be config- ured to identify the selected uplink transmit beam(s) selected by the base station based on the uplink beam measurements. For example, the communication and processing circuitry 1041 may be configured to receive an indication of the selected uplink transmit beam(s) from the base station.

In some examples, the communication and processing circuitry 1041 may be configured to generate and transmit a scheduling request (e.g., via UCI in a PUCCH) to the base station to receive an uplink grant for the PUSCH. The communication and processing circuitry 1041 may further be configured to generate an uplink signal and interact with the transceiver 1010 to transmit the uplink signal. The uplink signal may include, for example, a PUCCH, a PUSCH, an SRS, a DMRS, or a PRACH. The communication and processing circuitry 1041 may further be configured to interact with the transceiver 1010 to monitor for a downlink signal and decode a downlink signal. The downlink signal may include, for example, a PDCCH, a PDSCH, a CSI-RS, or a DMRS.

In some implementations where the communication involves receiving information, the communication and pro- cessing circuitry 1041 may obtain information from a com- ponent of the UE 1000 (e.g., from the transceiver 1010 that receives the information via radio frequency signaling or some other type of signaling suitable for the applicable communication medium), process (e.g., decode) the infor- mation, and output the processed information. For example, the communication and processing circuitry 1041 may out- put the information to another component of the processor 1004, to the memory 1005, or to the bus interface 1008. In some examples, the communication and processing circuitry 1041 may receive one or more of signals, messages, other information, or any combination thereof. In some examples, the communication and processing circuitry 1041 may receive information via one or more channels. In some examples, the communication and processing circuitry 1041 may include functionality for a means for receiving.

In some implementations where the communication involves sending (e.g., transmitting) information, the com- munication and processing circuitry 1041 may obtain infor- mation (e.g., from another component of the processor 1004, the memory 1005, or the bus interface 1008), process (e.g., encode) the information, and output the processed informa- tion. For example, the communication and processing cir- cuitry 1041 may output the information to the transceiver 1010 (e.g., that transmits the information via radio fre- quency signaling or some other type of signaling suitable for the applicable communication medium). In some examples, the communication and processing circuitry 1041 may send one or more of signals, messages, other information, or any combination thereof. In some examples, the communication and processing circuitry 1041 may send information via one or more channels. In some examples, the communication and processing circuitry 1041 may include functionality for a means for sending (e.g., means for transmitting).

The processor 1004 may include carrier aggregation (CA) configuration circuitry 1042 configured to perform CA con- figuration-related operations as discussed herein. The CA configuration circuitry 1042 may further be configured to provide the functionality of a means for determining a set of carrier aggregation bands to be used for downlink transmis- sions. The CA configuration circuitry 1042 may further be configured to provide the functionality of a means for determining a set of carrier aggregation bands to be used for uplink transmissions. The CA configuration circuitry 1042 may further be configured to provide the functionality of a means for determining traffic to be communicated. The CA configuration circuitry 1042 may further be configured to provide the functionality of a means for selecting a carrier aggregation configuration. The CA configuration circuitry 1042 may further be configured to execute CA configuration software 1052 included on the computer-readable medium 1006 to implement one or more functions described herein.

The processor 1004 may include carrier aggregation (CA) processing circuitry 1043 configured to perform CA processing-related operations as discussed herein. The CA processing circuitry 1043 may further be configured to provide the functionality of a means for receiving data from a base station. The CA processing circuitry 1043 may further be configured to provide the functionality of a means for transmitting data to a base station. The CA processing circuitry 1043 may further be configured to execute CA processing software 1053 included on the computer-readable medium 1006 to implement one or more functions described herein.

FIG. 11 is a flow chart illustrating an example method 1100 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the method 1100 may be carried out by the UE 1000 illustrated in FIG. 10. In some examples, the method 1100 may be carried out by any suitable apparatus or means for carrying out the functions or algorithm described below.

At block 1102, a UE may determine a first set of carrier aggregation bands to be used for downlink transmissions from a base station. In some examples, the determining the first set of carrier aggregation bands may include receiving an indication of the first set of carrier aggregation bands from the base station. For example, the CA configuration circuitry 1042 together with the communication and processing circuitry 1041 and the transceiver 1010, shown and described above in connection with FIG. 10, may receive an indication from a gNB that specifies the DL component carriers to be used for a scheduled carrier aggregation-based communication.

At block 1104, the UE may determine a second set of carrier aggregation bands to be used for uplink transmissions to the base station, wherein the second set of carrier aggregation bands includes a first frequency band that is not in the first set of carrier aggregation bands. For example, the CA configuration circuitry 1042 together with the communication and processing circuitry 1041 and the transceiver 1010, shown and described above in connection with FIG. 10, may receive an indication from a gNB that specifies the UL component carriers to be used for a scheduled carrier aggregation-based communication. As another example, the CA configuration circuitry 1042, shown and described above in connection with FIG. 10, may select the UL component carriers to be used for a scheduled carrier aggregation-based communication (e.g., based on a traffic condition, a use case, etc., as discussed herein).

In some examples, the determining the second set of carrier aggregation bands may include selecting the second set of carrier aggregation bands. In some examples, the selecting the second set of carrier aggregation bands may be independent of the first set of carrier aggregation bands.

At block 1106, the UE may receive first data from the base station via the first set of carrier aggregation bands. For example, the CA processing circuitry 1043 together with the communication and processing circuitry 1041 and the transceiver 1010, shown and described above in connection with FIG. 10, may receive a data transmission via multiple DL component carriers.

At block 1108, the UE may transmit second data to the base station via the second set of carrier aggregation bands. For example, the CA processing circuitry 1043 together with the communication and processing circuitry 1041 and the transceiver 1010, shown and described above in connection with FIG. 10, may transmit a data transmission via multiple UL component carriers.

In some examples, the selecting the second set of carrier aggregation bands may include determining that a larger coverage area than a threshold coverage area is needed for the uplink transmissions. In some examples, the selecting the second set of carrier aggregation bands may include selecting carrier aggregation for the uplink transmissions as a result of the determining that the larger coverage area than the threshold coverage area is needed for the uplink transmissions.

In some examples, the selecting the second set of carrier aggregation bands may include determining that a larger coverage area than a threshold coverage area is needed for the uplink transmissions and a higher throughput than a threshold throughput is needed for the downlink transmissions. In some examples, the selecting the second set of carrier aggregation bands may include selecting a first frequency band and a second frequency band for the second set of carrier aggregation bands as a result of the determining that the larger coverage area than the threshold coverage area is needed for the uplink transmissions and the higher throughput than the threshold throughput is needed for the downlink transmissions. In some examples, each of the first frequency band and the second frequency band may be lower in frequency than any frequency band of the first set of carrier aggregation bands. In some examples, the first set of carrier aggregation bands include millimeter wave frequency bands.

In some examples, the selecting the second set of carrier aggregation bands may include determining a traffic use case. In some examples, the selecting the second set of carrier aggregation bands may include selecting the second set of carrier aggregation bands based on the traffic use case. In some examples, the traffic use case may include at least one of an uplink traffic use case, a downlink traffic use case, or a combination thereof.

In some examples, the first set of carrier aggregation bands and the second set of carrier aggregation bands constitute a first carrier aggregation configuration of a plurality of carrier aggregation configurations. In some examples, the method may further include determining traffic to be communicated by the user equipment. In some examples, the method may further include selecting the first carrier aggregation configuration based on the traffic to be communicated by the user equipment.

In some examples, the traffic to be communicated by the user equipment may include traffic within a particular zone. In some examples, the particular zone may include at least one of: a geographical area, a paging area, a network operator zone, a population district, a manufacturing zone, a hotel zone, a customer zone, or any combination thereof.

In some examples, the plurality of carrier aggregation configurations may include a third set of downlink carrier aggregation bands and a fourth set of uplink carrier aggregation bands. In some examples, the fourth set of uplink carrier aggregation bands may be a subset of the third set of downlink carrier aggregation bands.

In some examples, the first set of carrier aggregation bands consists of at least one n78 band and the second set of carrier aggregation bands includes at least one of an nl band, an n3 band, or a combination thereof. In some examples, the first set of carrier aggregation bands consists of at least one of an n78 band, a first n1 band, a first n3 band, or a combination thereof, and the second set of carrier aggregation bands includes at least one of a second n1 band, a second n3 band, or a combination thereof. In some examples, the first set of carrier aggregation bands consists of at least one of an n79 band, a first n41 band, or a combination thereof, and the second set of carrier aggregation bands includes at least one of a second n41 band, an n28 band, or a combination thereof. In some examples, the first set of carrier aggregation bands consists of at least one of an n79 band, an n41 band, or a combination thereof, and the second set of carrier aggregation bands includes at least one of an n40 band, an n28 band, or a combination thereof. In some examples, the first set of carrier aggregation bands consists of at least two of an n79 band, an n41 band, an N40 band, an N28 band, or a combination thereof, and the second set of carrier aggregation bands includes at least one of an n78 band, an n1 band, an n3 band, or an n5 band.

FIG. 12 is a conceptual diagram illustrating an example of a hardware implementation for base station (BS) 1200 employing a processing system 1214. In some implementations, the BS 1200 may correspond to any of the BSs (e.g., gNBs,) or scheduling entities shown in any of FIGS. 1, 2, 4, 6, 7, 8, and 9.

In accordance with various aspects of the disclosure, an element, or any portion of an element, or any combination of elements may be implemented with the processing system 1214. The processing system may include one or more processors 1204. The processing system 1214 may be substantially the same as the processing system 1014 illustrated in FIG. 10, including a bus interface 1208, a bus 1202, memory 1205, a processor 1204, and a computer-readable medium 1206. Furthermore, the BS 1200 may include an interface 1230 (e.g., a network interface) that provides a means for communicating with at least one other apparatus within a core network and with at least one radio access network.

The BS 1200 may be configured to perform any one or more of the operations described herein (e.g., as described above in conjunction with FIGS. 1-9 and as described below in conjunction with FIG. 13). In some aspects of the disclosure, the processor 1204, as utilized in the BS 1200, may include circuitry configured for various functions.

The processor 1204 may be configured to generate, schedule, and modify a resource assignment or grant of time-frequency resources (e.g., a set of one or more resource elements). For example, the processor 1204 may schedule time-frequency resources within a plurality of time division duplex (TDD) and/or frequency division duplex (FDD) subframes, slots, and/or mini-slots to carry user data traffic and/or control information to and/or from multiple UEs.

The processor 1204 may be configured to schedule resources for the transmission of a downlink signal. The downlink signal may include, for example, a PDCCH, a PDSCH, a CSI-RS, or a DMRS. The processor 1204 may further be configured to schedule resources that may be utilized by a UE to transmit an uplink signal. The uplink signal may include, for example, a PUCCH, a PUSCH, an SRS, a DMRS, or a PRACH. The processor 1204 may further be configured to schedule resources that may be utilized by a UE to transmit and/or receive a sidelink signal.

In some aspects of the disclosure, the processor 1204 may include communication and processing circuitry 1241. The communication and processing circuitry 1244 may be configured to communicate with a UE. The communication and processing circuitry 1241 may include one or more hardware components that provide the physical structure that performs various processes related to communication (e.g., signal reception and/or signal transmission) as described herein. The communication and processing circuitry 1241 may further include one or more hardware components that provide the physical structure that performs various processes related to signal processing (e.g., processing a received signal and/or processing a signal for transmission) as described herein. The communication and processing circuitry 1241 may further be configured to execute communication and processing software 1251 included on the computer-readable medium 1206 to implement one or more functions described herein. The communication and processing circuitry 1241 may further be configured to interact with the transceiver 1210 to encode and transmit a downlink signal. The communication and processing circuitry 1241 may further be configured to interact with the transceiver 1210 to monitor for and decode an uplink signal.

In some examples, the communication and processing circuitry 1241 may be configured to receive and process uplink beamformed signals at a mmWave frequency or a sub-6 GHz frequency via the transceiver 1210 and an antenna array 1220. For example, the communication and processing circuitry 1241 may be configured to receive a respective reference signal (e.g., SRS or DMRS) on each of a plurality of uplink beams from the UE during an uplink beam sweep.

In some examples, the communication and processing circuitry 1241 may further be configured to generate and transmit downlink beamformed signals at a mmWave frequency or a sub-6 GHz frequency via the transceiver 1210 and the antenna array 1220. For example, the communication and processing circuitry 1241 may be configured to transmit a respective downlink reference signal (e.g., SSB or CSI-RS) on each of a plurality of downlink beams to the UE during a downlink beam sweep via at least one first antenna panel of the antenna array 1220. The communication and processing circuitry 1241 may further be configured to receive a beam measurement report from the UE.

The communication and processing circuitry 1241 may further be configured to receive an uplink signal on one or more uplink receive beams via one or more uplink transmit beams applied to the uplink signal. For example, the communication and processing circuitry 1241 may be configured to receive the uplink signal on one or more uplink receive beams via at least one second antenna panel of the antenna array 1220. The uplink signal may include, for example, a PUCCH, PUSCH, SRS, DMRS, or PRACH.

The communication and processing circuitry 1241 may further be configured to control the antenna array 1220 and transceiver 1210 to generate a plurality of downlink transmit beams during a downlink beam sweep. The communication and processing circuitry 1241 may further be configured to receive a beam measurement report from the UE using the communication and processing circuitry 1244. The communication and processing circuitry 1241 may further be configured to identify one or more selected uplink beam(s) based on the beam measurements. In some examples, the communication and processing circuitry 1241 may be configured to compare the respective RSRP (or other beam measurement) measured on each of the downlink receive beams for each of the serving downlink transmit beams to identify the serving downlink receive beams and to further identify the serving downlink receive beams as the selected uplink transmit beams. Each serving downlink receive beam may have the highest measured RSRP (or other beam measurement) for one of the downlink transmit beams.

The communication and processing circuitry 1241 may be configured to receive one or more uplink transmit beams in an uplink beam sweep. Each uplink transmit beam may carry an uplink reference signal (e.g., an SRS) for measurement by the communication and processing circuitry 1241. The communication and processing circuitry 1241 may further be configured to obtain a plurality of beam measurements on each of a plurality of uplink receive beams of the antenna array 1220 for each of the uplink transmit beams. The communication and processing circuitry 1241 may further be configured to select the selected uplink transmit beam(s) and corresponding uplink receive beams forming respective uplink BPLs based on the uplink beam measurements.

In some implementations where the communication involves receiving information, the communication and processing circuitry 1241 may obtain information from a component of the BS 1200 (e.g., from the transceiver 1210 that receives the information via radio frequency signaling or some other type of signaling suitable for the applicable communication medium), process (e.g., decode) the information, and output the processed information. For example, the communication and processing circuitry 1241 may output the information to another component of the processor 1204, to the memory 1205, or to the bus interface 1208. In some examples, the communication and processing circuitry 1241 may receive one or more of signals, messages, other information, or any combination thereof. In some examples, the communication and processing circuitry 1241 may receive information via one or more channels. In some examples, the communication and processing circuitry 1241 may include functionality for a means for receiving.

In some implementations where the communication involves sending (e.g., transmitting) information, the communication and processing circuitry 1241 may obtain information (e.g., from another component of the processor 1204, the memory 1205, or the bus interface 1208), process (e.g., encode) the information, and output the processed information. For example, the communication and processing circuitry 1241 may output the information to the transceiver 1210 (e.g., that transmits the information via radio frequency signaling or some other type of signaling suitable for the applicable communication medium). In some examples, the communication and processing circuitry 1241 may send one or more of signals, messages, other information, or any combination thereof. In some examples, the communication and processing circuitry 1241 may send information via one or more channels. In some examples, the communication and processing circuitry 1241 may include functionality for a means for sending (e.g., means for transmitting).

The processor 1204 may include carrier aggregation (CA) configuration circuitry 1242 configured to perform CA configuration-related operations as discussed herein. The CA configuration circuitry 1242 may further be configured to provide the functionality of a means for determining a set of carrier aggregation bands to be used for downlink transmissions. The CA configuration circuitry 1242 may further be configured to provide the functionality of a means for determining a set of carrier aggregation bands to be used for uplink transmissions. The CA configuration circuitry 1242 may further be configured to provide the functionality of a means for determining traffic to be communicated. The CA configuration circuitry 1242 may further be configured to provide the functionality of a means for selecting a carrier aggregation configuration. The CA configuration circuitry 1242 may further be configured to execute CA configuration software 1252 included on the computer-readable medium 1206 to implement one or more functions described herein.

The processor 1204 may include carrier aggregation (CA) processing circuitry 1243 configured to perform CA processing-related operations as discussed herein. The CA processing circuitry 1243 may further be configured to provide the functionality of a means for receiving data from a user equipment. The CA processing circuitry 1243 may further be configured to provide the functionality of a means for transmitting data to a user equipment. The CA processing circuitry 1243 may further be configured to execute CA processing software 1253 included on the computer-readable medium 1206 to implement one or more functions described herein.

FIG. 13 is a flow chart illustrating an example method 1300 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the method 1300 may be carried out by the BS 1200 illustrated in FIG. 12. In some examples, the method 1300 may be carried out by any suitable apparatus or means for carrying out the functions or algorithm described below.

At block 1302, a BS may determine a first set of carrier aggregation bands to be used for downlink transmissions. For example, the CA configuration circuitry 1242, shown and described above in connection with FIG. 12, may select the DL component carriers to be used for a scheduled carrier aggregation-based communication (e.g., based on a traffic condition, a use case, etc., as discussed herein).

At block 1304, the BS may determine a second set of carrier aggregation bands to be used for uplink transmissions from a user equipment, wherein the second set of carrier aggregation bands includes a first frequency band that is not in the first set of carrier aggregation bands. For example, the CA configuration circuitry 1242, shown and described above in connection with FIG. 12, may select the UL component carriers to be used for a scheduled carrier aggregation-based communication (e.g., based on a traffic condition, a use case, etc., as discussed herein).As another example, the CA configuration circuitry 1242, shown and described above in connection with FIG. 12, may receive an indication from a UE that specifies the UL component carriers to be used for a scheduled carrier aggregation-based communication.

At block 1306, the BS may transmit first data to the user equipment via the first set of carrier aggregation bands. For example, the CA processing circuitry 1243 together with the communication and processing circuitry 1241 and the transceiver 1210, shown and described above in connection with FIG. 12, may transmit a data transmission via multiple DL component carriers.

At block 1308, the BS may receive second data from the user equipment via the second set of carrier aggregation bands. For example, the CA processing circuitry 1243 together with the communication and processing circuitry 1241 and the transceiver 1210, shown and described above in connection with FIG. 12, may receive a data transmission via multiple UL component carriers.

In some examples, the first set of carrier aggregation bands and the second set of carrier aggregation bands constitute a first carrier aggregation configuration of a plurality of carrier aggregation configurations. In some examples, the method may further include determining traffic to be communicated by the base station and selecting the first carrier aggregation configuration based on the traffic to be communicated by the base station. In some examples, the traffic to be communicated by the base station may include traffic within a particular zone. In some examples, the particular zone may include at least one of: a geographical area, a paging area, a network operator zone, a population district, a manufacturing zone, a hotel zone, a customer zone, or any combination thereof. In some examples, the plurality of carrier aggregation configurations may include a third set of downlink carrier aggregation bands and a fourth set of uplink carrier aggregation bands. In some examples, the fourth set of uplink carrier aggregation bands may be a subset of the third set of downlink carrier aggregation bands.

In some examples, the first set of carrier aggregation bands consists of at least one n78 band and the second set of carrier aggregation bands includes at least one of an n1 band, an n3 band, or a combination thereof. In some examples, the first set of carrier aggregation bands consists of at least one of an n78 band, an n1 band, an n3 band, or a combination thereof, and the second set of carrier aggregation bands includes at least one of an n1 band, an n3 band, or a combination thereof. In some examples, the first set of carrier aggregation bands consists of at least one of an n79 band, an n41 band, or a combination thereof, and the second set of carrier aggregation bands includes at least one of an n41 band, an n28 band, or a combination thereof. In some examples, the first set of carrier aggregation bands consists of at least one of an n79 band, an n41 band, or a combination thereof, and the second set of carrier aggregation bands includes at least one of an n40 band, an n28 band, or a combination thereof. In some examples, the first set of carrier aggregation bands consists of at least two of an n79 band, an n41 band, an N40 band, an N28 band, or a combination thereof, and the second set of carrier aggregation bands includes at least one of an n78 band, an n1 band, an n3 band, or an n5 band.

In some examples, the determining the second set of carrier aggregation bands may include receiving an indication of the second set of carrier aggregation bands from the user equipment. In some examples, the determining the first set of carrier aggregation bands may include selecting the first set of carrier aggregation bands. In some examples, the determining the second set of carrier aggregation bands may include selecting the second set of carrier aggregation bands. In some examples, the selecting the second set of carrier aggregation bands may be independent of the selecting of the first set of carrier aggregation bands.

In some examples, the selecting the second set of carrier aggregation bands may include determining that a larger coverage area than a threshold coverage area is needed for the uplink transmissions. In some examples, the selecting the second set of carrier aggregation bands may include selecting carrier aggregation for the uplink transmissions as a result of the determining that the larger coverage area than the threshold coverage area is needed for the uplink transmissions.

In some examples, the selecting the second set of carrier aggregation bands may include determining that a larger coverage area than a threshold coverage area is needed for the uplink transmissions and a higher throughput than a threshold throughput is needed for the downlink transmissions. In some examples, the selecting the second set of carrier aggregation bands may include selecting a first frequency band and a second frequency band for the second set of carrier aggregation bands as a result of the determining that the larger coverage area than the threshold coverage area is needed for the uplink transmissions and the higher throughput than the threshold throughput is needed for the downlink transmissions. In some examples, each of the first frequency band and the second frequency band is lower in frequency than any frequency band of the first set of carrier aggregation bands. In some examples, the first set of carrier aggregation bands include millimeter wave frequency bands.

In some examples, the selecting the second set of carrier aggregation bands may include determining a traffic use case. In some examples, the selecting the second set of carrier aggregation bands may include selecting the second set of carrier aggregation bands to match the traffic use case. In some examples, the traffic use case may include at least one of an uplink traffic use case, a downlink traffic use case, or a combination thereof.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 6, 7, 8, 9, 10, and 12 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An apparatus for wireless communication, comprising:
   one or more transceivers;
   one or more memories configured to store processor-executable code; and
   one or more processors configured to execute the processor-executable code to cause the apparatus to:
      receive, via the one or more transceivers, a carrier aggregation configuration that indicates a first set of carrier aggregation bands associated with a downlink transmission and a second set of carrier aggregation bands associated with an uplink transmission, wherein each frequency band of the second set of carrier aggregation bands is not included in the first set of carrier aggregation bands;
      receive first data via the one or more transceivers and the first set of carrier aggregation bands associated with a downlink transmission;
      select the second set of carrier aggregation bands associated with the uplink transmission; and
   transmit second data via the one or more transceivers and the second set of carrier aggregation bands.

2. The apparatus of claim 1, wherein to select the second set of carrier aggregation bands, the one or more processors are configured to execute the processor-executable code to cause the apparatus to:
   select the second set of carrier aggregation bands based on at least one beam measurement.

3. The apparatus of claim 1, wherein the selection of the second set of carrier aggregation bands is independent of the first set of carrier aggregation bands.

4. The apparatus of claim 1, wherein the one or more processors are further configured to execute the processor-executable code to cause the apparatus to:
   select carrier aggregation for the uplink transmission based on a coverage area larger than a threshold coverage area being needed for the uplink transmission.

5. The apparatus of claim 1, wherein the one or more processors are further configured to execute the processor-executable code to cause the apparatus to:
   select a first frequency band and a second frequency band associated with the second set of carrier aggregation bands based on a coverage area larger than a threshold coverage area being needed for the uplink transmission and a throughput higher than a threshold throughput being needed for the downlink transmission, wherein each of the first frequency band and the second frequency band is lower in frequency than any frequency band of the first set of carrier aggregation bands.

6. The apparatus of claim 5, wherein the first set of carrier aggregation bands includes millimeter wave frequency bands.

7. The apparatus of claim 1, wherein to select the second set of carrier aggregation bands, the one or more processors are configured to execute the processor-executable code to cause the apparatus to:
   select the second set of carrier aggregation bands based on a traffic use case.

8. The apparatus of claim 7, wherein the traffic use case comprises at least one of an uplink traffic use case or a downlink traffic use case.

9. The apparatus of claim 1, wherein the first set of carrier aggregation bands and the second set of carrier aggregation bands constitute a first carrier aggregation configuration of a plurality of carrier aggregation configurations.

10. The apparatus of claim 9, wherein the one or more processors are further configured to execute the processor-executable code to cause the apparatus to:
   select the first carrier aggregation configuration based on traffic to be communicated by the apparatus.

11. The apparatus of claim 10, wherein the traffic to be communicated by the apparatus comprises traffic within a particular zone.

12. The apparatus of claim 11, wherein the particular zone comprises at least one of: a geographical area, a paging area, a network operator zone, a population district, a manufacturing zone, a hotel zone, or a customer zone.

13. The apparatus of claim 1, wherein:
   the first set of carrier aggregation bands consists of at least one n78 band; and
   the second set of carrier aggregation bands includes at least one of an n1 band or an n3 band.

14. The apparatus of claim 1, wherein:
   the first set of carrier aggregation bands consists of an n78 band; and
   the second set of carrier aggregation bands includes at least one of an n1 band or an n3 band.

15. The apparatus of claim 1, wherein the apparatus is configured to operate as a user equipment.

16. An apparatus for wireless communication, comprising:

one or more transceivers;

one or more memories configured to store processor-executable code; and one or more processors configured to execute the processor-executable code to cause the apparatus to:

transmit, via the one or more transceivers, a carrier aggregation configuration that indicates a first set of carrier aggregation bands associated with a downlink transmission and a second set of carrier aggregation bands associated with an uplink transmission, wherein each frequency band of the second set of carrier aggregation bands is not included in the first set of carrier aggregation bands;

transmit first data via the one or more transceivers and a first set of carrier aggregation bands associated with a downlink transmission;

select the second set of carrier aggregation bands associated with the uplink transmission; and receive second data via the one or more transceivers and the second set of carrier aggregation bands.

17. The apparatus of claim 16, wherein the first set of carrier aggregation bands and the second set of carrier aggregation bands constitute a first carrier aggregation configuration of a plurality of carrier aggregation configurations.

18. The apparatus of claim 17, wherein the one or more processors are further configured to execute the processor-executable code to cause the apparatus to:

select the first carrier aggregation configuration based on traffic to be communicated by the apparatus.

19. The apparatus of claim 18, wherein the traffic to be communicated by the apparatus comprises traffic within a particular zone.

20. The apparatus of claim 19, wherein the particular zone comprises at least one of: a geographical area, a paging area, a network operator zone, a population district, a manufacturing zone, a hotel zone.

21. The apparatus of claim 18, wherein the plurality of carrier aggregation configurations comprise:

a third set of carrier aggregation bands; and a fourth set of carrier aggregation bands.

22. The apparatus of claim 16, wherein:

the first set of carrier aggregation bands consists of at least one n78 band; and the second set of carrier aggregation bands includes at least one of an n1 band or an n3 band.

23. The apparatus of claim 16, wherein:

the first set of carrier aggregation bands consists of at least one of an n78 band or an n1 band; and the second set of carrier aggregation bands includes an n3 band.

24. The apparatus of claim 16, wherein:

the first set of carrier aggregation bands consists of an n79 band; and the second set of carrier aggregation bands includes at least one of an n41 band or an n28 band.

25. The apparatus of claim 16, wherein:

the first set of carrier aggregation bands consists of at least one of an n79 band or an n41 band; and the second set of carrier aggregation bands includes at least one of an n40 band or an n28 band.

26. The apparatus of claim 16, wherein:

the first set of carrier aggregation bands consists of at least two of an n79 band, an n41 band, an N40 band, or an N28 band; and the second set of carrier aggregation bands includes at least one of an n78 band, an n1 band, an n3 band, or an n5 band.

27. The apparatus of claim 16, wherein to select the second set of carrier aggregation bands, the one or more processors are configured to execute the processor-executable code to cause the apparatus to:

receive, via the one or more transceivers, an indication of the second set of carrier aggregation bands from a user equipment.

28. The apparatus of claim 16, wherein the one or more processors are further configured to execute the processor-executable code to cause the apparatus to:

select the first set of carrier aggregation bands based on at least one of a traffic condition or a use case.

29. The apparatus of claim 28, wherein to select the second set of carrier aggregation bands, the one or more processors are configured to execute the processor-executable code to cause the apparatus to select the second set of carrier aggregation bands based on the traffic condition.

30. The apparatus of claim 29, wherein the selection of the second set of carrier aggregation bands is independent of the selection of the first set of carrier aggregation bands.

31. The apparatus of claim 29, wherein the one or more processors are further configured to execute the processor-executable code to cause the apparatus to:

select carrier aggregation for the uplink transmission based on a coverage area larger than a threshold coverage area being needed for the uplink transmission.

32. The apparatus of claim 29, wherein the one or more processors are further configured to execute the processor-executable code to cause the apparatus to:

select a first frequency band and a second frequency band associated with the second set of carrier aggregation bands based on a coverage area larger than a threshold coverage area being needed for the uplink transmission and a throughput higher than a threshold throughput being needed for the downlink transmission, wherein each of the first frequency band and the second frequency band is lower in frequency than any frequency band of the first set of carrier aggregation bands.

33. The apparatus of claim 29, wherein the one or more processors are further configured to execute the processor-executable code to cause the apparatus to:

select the second set of carrier aggregation bands based on the use case.

34. The apparatus of claim 33, wherein the use case comprises at least one of an uplink traffic use case.

35. The apparatus of claim 16, wherein the apparatus is configured to operate as a network entity.

* * * * *